United States Patent
McClory et al.

(10) Patent No.: US 10,691,514 B2
(45) Date of Patent: Jun. 23, 2020

(54) SYSTEM AND METHOD FOR INTEGRATION, TESTING, DEPLOYMENT, ORCHESTRATION, AND MANAGEMENT OF APPLICATIONS

(71) Applicant: Datapipe, Inc., Jersey City, NJ (US)

(72) Inventors: Thomas Patrick McClory, Carlsbad, CA (US); Jatil Chandrakant Damania, Jersey City, NJ (US); Scott Matthew Vidmar, Graham, WA (US); Joshua Matthew Leder, La Union (CR); Allen Turner Hurff, Los Angeles, CA (US)

(73) Assignee: DATAPIPE, INC., Jersey City, NJ (US)

( * ) Notice: Subject to any disclaimer, the term of this patent is extended or adjusted under 35 U.S.C. 154(b) by 0 days.

(21) Appl. No.: 15/617,428

(22) Filed: Jun. 8, 2017

(65) Prior Publication Data
US 2018/0321918 A1    Nov. 8, 2018

Related U.S. Application Data

(60) Provisional application No. 62/503,079, filed on May 8, 2017.

(51) Int. Cl.
*G06F 8/30* (2018.01)
*G06F 9/455* (2018.01)
(Continued)

(52) U.S. Cl.
CPC ........... *G06F 9/546* (2013.01); *G06F 8/30* (2013.01); *G06F 8/41* (2013.01); *G06F 8/60* (2013.01);
(Continued)

(58) Field of Classification Search
None
See application file for complete search history.

(56) References Cited

U.S. PATENT DOCUMENTS 9,282,097 B2 *   3/2016   Agarwal .............. G06F 21/41
9,461,996 B2 *  10/2016   Hayton ............. H04L 63/0815
(Continued)

OTHER PUBLICATIONS

Tsai, Wei-Tek, Yu Huang, and Qihong Shao. "EasySaaS: A SaaS development framework." Service-oriented computing and applications (soca),2011 ieee international conference on. IEEE,2011. (Year: 2011).*

(Continued)

*Primary Examiner* — Matthew J Brophy
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for creating and managing a software application. In an embodiment, an application template may first be identified. Application creation configuration information for a new software application may then be determined based on the identified application template. Application source code information may be generated based on the application creation configuration information and stored in a provisioned application source code data store. A build of the application source code information may then be initiated to generate the software application. An application infrastructure configured to host the software application may be provisioned in an infrastructure services provider system, and the software application may be automatically deployed to the provisioned application infrastructure including appropriate security concerns. Additionally, application infrastructure and deployment telemetry may be generated (Continued)

to monitor health of software application and associated infrastructure.

20 Claims, 7 Drawing Sheets

(51) Int. Cl.

| | | |
|---|---|---|
| G06F 9/54 | (2006.01) | |
| G06F 9/50 | (2006.01) | |
| H04L 12/24 | (2006.01) | |
| H04L 29/06 | (2006.01) | |
| G06F 8/41 | (2018.01) | |
| G06F 8/60 | (2018.01) | |
| G06F 8/71 | (2018.01) | |
| G06F 11/36 | (2006.01) | |
| G06Q 10/06 | (2012.01) | |
| H04L 29/08 | (2006.01) | |
| G06F 8/77 | (2018.01) | |

(52) U.S. Cl.
CPC ............ *G06F 8/71* (2013.01); *G06F 9/45558* (2013.01); *G06F 9/505* (2013.01); *G06F 9/5027* (2013.01); *G06F 11/3684* (2013.01); *G06F 11/3688* (2013.01); *G06Q 10/06398* (2013.01); *H04L 41/5041* (2013.01); *H04L 41/5054* (2013.01); *H04L 63/0236* (2013.01); *H04L 63/0281* (2013.01); *G06F 8/77* (2013.01); *G06F 2009/45583* (2013.01); *G06F 2009/45587* (2013.01); *G06F 2009/45591* (2013.01); *G06F 2209/501* (2013.01); *G06F 2209/541* (2013.01); *G06F 2209/548* (2013.01); *H04L 41/5083* (2013.01); *H04L 63/1433* (2013.01); *H04L 67/10* (2013.01)

(56) References Cited

U.S. PATENT DOCUMENTS

| | | | |
|---|---|---|---|
| 9,485,303 B2 | 11/2016 | Lee et al. | |
| 9,602,427 B2* | 3/2017 | Patel | H04L 67/10 |
| 9,800,518 B2* | 10/2017 | Brown | H04L 47/724 |
| 9,912,613 B2* | 3/2018 | Chou | H04L 49/25 |
| 10,013,239 B2* | 7/2018 | Zhang | G06F 8/38 |
| 10,341,194 B2* | 7/2019 | Stella | H04L 67/10 |
| 10,459,750 B2* | 10/2019 | Zhang | G06F 9/4856 |
| 2002/0133504 A1 | 9/2002 | Vlahos et al. | |
| 2006/0117055 A1* | 6/2006 | Doyle | G06F 9/451 |
| 2010/0241722 A1 | 9/2010 | Seminaro et al. | |
| 2013/0007183 A1 | 1/2013 | Sorenson, III et al. | |
| 2014/0108665 A1* | 4/2014 | Arora | H04L 67/141 709/227 |
| 2014/0130056 A1 | 5/2014 | Goodman | |
| 2014/0280658 A1 | 9/2014 | Boling et al. | |
| 2014/0282421 A1* | 9/2014 | Jubran | G06F 11/3664 717/126 |
| 2014/0344672 A1* | 11/2014 | Kapoor | G09B 7/00 715/235 |
| 2014/0351686 A1 | 11/2014 | Yawn | |
| 2014/0351921 A1* | 11/2014 | Madani | H04L 63/029 726/14 |
| 2015/0081880 A1* | 3/2015 | Eaton | H04L 47/785 709/224 |
| 2015/0172148 A1 | 6/2015 | Ishida et al. | |
| 2015/0186132 A1* | 7/2015 | Oliveri | G06F 8/34 717/120 |
| 2015/0220740 A1* | 8/2015 | Patel | H04L 67/10 726/26 |
| 2016/0019300 A1 | 1/2016 | Dove et al. | |
| 2016/0048408 A1* | 2/2016 | Madhu | G06F 11/2097 718/1 |
| 2016/0087960 A1* | 3/2016 | Pleau | H04L 63/0884 726/7 |
| 2016/0092179 A1* | 3/2016 | Straub | G06F 8/71 717/107 |
| 2016/0092297 A1 | 3/2016 | Mazon et al. | |
| 2016/0127254 A1 | 5/2016 | Kumar et al. | |
| 2016/0294732 A1* | 10/2016 | Chou | H04L 49/25 |
| 2016/0357660 A1* | 12/2016 | Dean | G06F 11/3692 |
| 2017/0004185 A1 | 1/2017 | Zhu et al. | |
| 2017/0099191 A1* | 4/2017 | Stella | H04L 41/145 |
| 2017/0131974 A1* | 5/2017 | Balasubramanian | G06F 8/30 |
| 2017/0180289 A1 | 6/2017 | Chiappone et al. | |
| 2017/0195386 A1 | 7/2017 | Nathan et al. | |
| 2018/0027051 A1* | 1/2018 | Parees | H04L 67/10 709/217 |
| 2018/0074973 A1 | 3/2018 | Chan et al. | |
| 2018/0089328 A1 | 3/2018 | Bath et al. | |
| 2018/0136960 A1* | 5/2018 | Zhang | G06F 9/5088 |
| 2018/0165066 A1* | 6/2018 | Sinha | G06F 8/24 |
| 2018/0165124 A1* | 6/2018 | Sinha | G06F 9/45504 |
| 2018/0181376 A1* | 6/2018 | Balasubramanian | G06F 3/0482 |
| 2018/0262592 A1 | 9/2018 | Zandi et al. | |
| 2018/0321918 A1* | 11/2018 | McClory | H04L 41/5041 |
| 2018/0321979 A1 | 11/2018 | Bahramshahry et al. | |
| 2018/0321993 A1* | 11/2018 | McClory | H04L 41/5054 |
| 2018/0322437 A1* | 11/2018 | McClory | G06F 11/3688 |
| 2018/0324204 A1* | 11/2018 | McClory | G06F 9/5027 |

OTHER PUBLICATIONS

Chieu, Trieu C., et al. "Dynamic scaling of web applications in a virtualized cloud computing environment." 2009 IEEE International Conference on e-Business Engineering. IEEE, 2009. (Year: 2009).*

Espadas, Javier, et al. "A tenant-based resource allocation model for scaling Software-as-a-Service applications over cloud computing infrastructures." Future Generation Computer Systems 29.1 (2013): 273-286. (Year: 2013).*

Nguyen, Hiep, et al. "{Agile}: Elastic Distributed Resource Scaling for Infrastructure-as-a-Service." Proceedings of the 10th International Conference on Autonomic Computing ({ICAC} 13). (Year: 2013).*

Bergmayr, Alexander, et al. "UML-based cloud application modeling with libraries, profiles, and templates." CloudMDE 2014: 2nd International Workshop on Model-Driven Engineering on and for the Cloud co-located with the 17th International Conference on Model Driven Engineering Languages and Systems. (Year: 2014).*

Non-Final Office Action directed to U.S. Appl. No. 15/655,128, dated Dec. 13, 2018, 24 pages.

Non-Final Office Action directed to U.S. Appl. No. 15/695,988, dated Dec. 13, 2018, 31 pages.

* cited by examiner

SYSTEM AND METHOD FOR INTEGRATION, TESTING, DEPLOYMENT, ORCHESTRATION, AND MANAGEMENT OF APPLICATIONS

CROSS REFERENCE TO RELATED APPLICATION

This application claims the benefit of priority to U.S. Provisional Application No. 62/503,079, filed on May 8, 2017, which is herein incorporated by reference in its entirety.

BACKGROUND

Field

This disclosure is generally directed to creation and deployment of applications. More particularly, this disclosure relates to integration, testing, orchestration, and deployment of applications.

Background

The transition of the traditional physical infrastructure to a service-oriented architecture has allowed application developers to focus more on the development of their applications rather than maintaining their own physical infrastructure. However, to meet demands from internal and external customers (e.g., high availability, incremental improvements, etc.), the ability to rapidly troubleshoot, fix, iterate, and update deployed applications have become a necessity. Accordingly, new solutions and mechanisms are required to enable application developers to architect, design, build, test, and deploy their applications to the various infrastructure as a service (IaaS) providers.

SUMMARY

Provided herein are system, apparatus, article of manufacture, method and/or computer program product embodiments, and/or combinations and sub-combinations thereof, for orchestration, integration, testing, and deployment of applications.

According to an embodiment, an application template stored in a template data store may first be identified. Application creation configuration information for a new software application may then be determined based on the identified application template. Application source code information may be generated based on the application creation configuration information. In an embodiment, the application source code information may include application build configuration information. An application source code data store may be provisioned based on the application creation configuration information, and the generated application source information may be stored in the application source code data store.

In an embodiment, a build of the application source code information may be initiated to generate the software application. An application infrastructure configured to host the software application may be provisioned in an infrastructure services provider system based on the application creation configuration information. Finally, the software application may be deployed to the application infrastructure upon generation of the software application.

Further embodiments, features, and advantages of the disclosure, as well as the structure and operation of the various embodiments, are described in detail below with reference to accompanying drawings.

BRIEF DESCRIPTION OF THE FIGURES

The accompanying drawings are incorporated herein and form a part of the specification.

Figure 1:
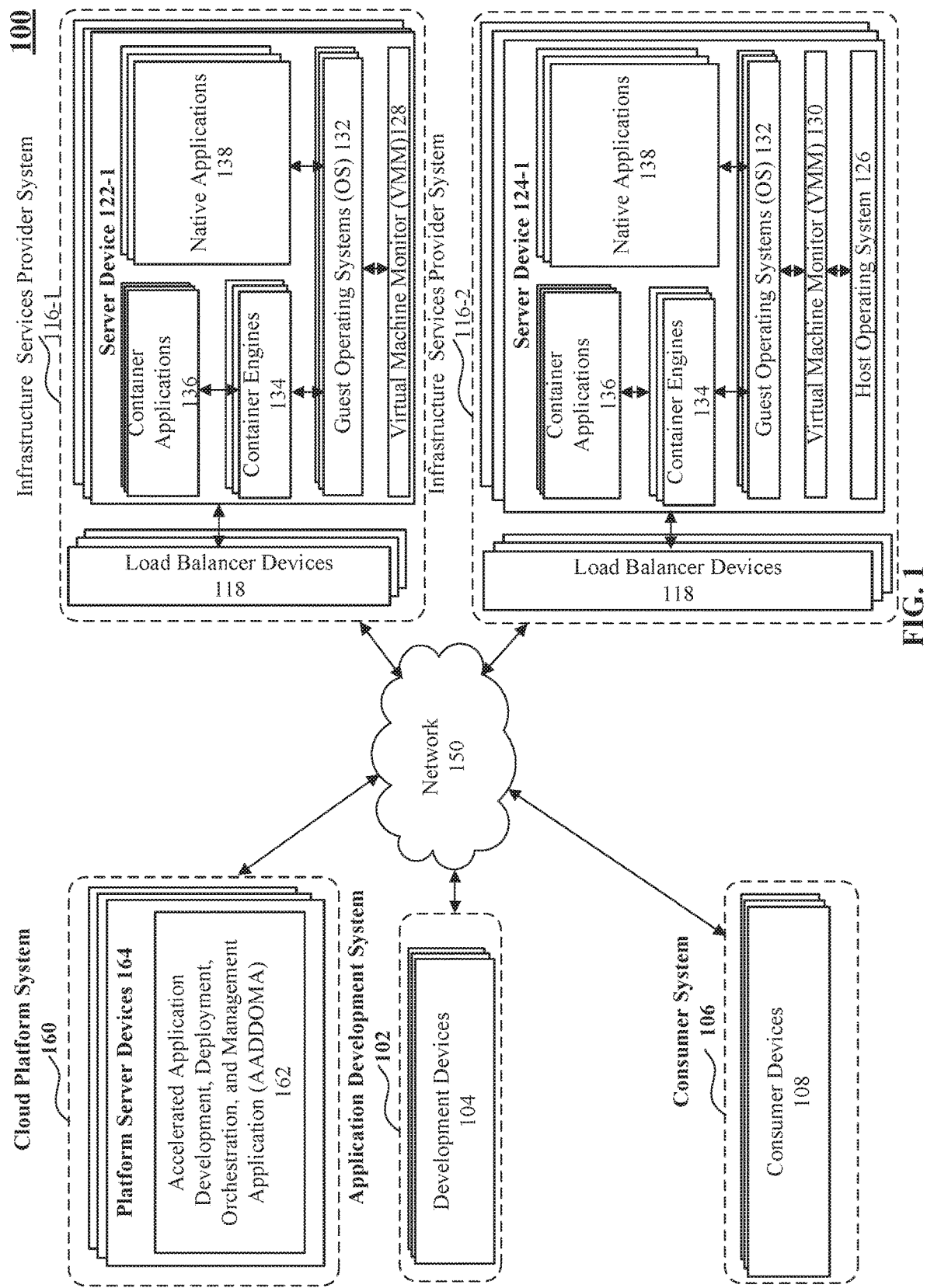
FIG. 1 illustrates a block diagram of Accelerated Application Development, Deployment, Orchestration, and Management System (AADDOMS) in an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 116-$n$ may include elements 116-1, 116-2, 116-3, and 116-4. Furthermore, unless explicitly stated otherwise, a complete set of elements may vary for a given feature, embodiment, and/or implementation even though the same designator may be used between various features, embodiments, and/or implementations.

DETAILED DESCRIPTION

With the availability of IaaS providers, application developers are no longer required to setup, maintain, and update their own physical infrastructure (e.g., server devices, network devices, storage devices, etc.) that host their applications and provide services to their customers. While such a transition of the traditional physical infrastructure to a microservices-based or cloud-native architecture allowed application developers to focus more on the development of their applications rather than maintaining their own physical infrastructure, new solutions and mechanisms are required to enable organizations and their application developers to architect, design, build, test, and deploy their applications to the various IaaS providers. Furthermore, the initial deployment of an application is typically only the beginning of the application's life cycle. In order to meet demands from internal and external customers (e.g., high availability, incremental improvements, etc.), the ability to rapidly troubleshoot, fix, iterate, and update deployed applications have become a necessity.

While existing solutions enable the application developers to accomplish some of these functionalities (e.g., deployment of their applications, testing of their applications, etc.), many of these functionalities are fragmented in various different solutions. Furthermore, extensive knowledge, configuration, and modifications of these different solutions are also typically required in order to create, develop, test, and deploy an application to an infrastructure services provider. This is often implemented with little consistency, and there is a lack of a dedicated management method. And even with such configurations and modifications, the existing solutions do not enable an application developer to: (1) quickly create an application with a customizable development pipeline that incorporate the best development practices, (2) rapidly build, test, and deploy their application on a continuous basis to their desired infrastructure services providers; (3) monitor, access, and receive alerts regarding performance of their deployed applications, and (4) provide authentication, authorization, access control, and/or accounting with respect to their deployed applications in an integrated solution.

FIG. 1 illustrates a block diagram of the AADDOMS 100 that provides an integrated solution that enables application developers to achieve these and other functionalities according to an example embodiment. In particular, the AADDOMS 100 may include a cloud platform system 160, application development system 102, consumer system 106, and infrastructure services provider systems 116, where each of these systems may be operatively and communicatively coupled via network 150.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network.

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the network 150 may also include various wired network devices configured to receive and/or transmit the encoded information as electrical and/or optical signals consistent with one or more wired and/or optical network standards (e.g., Ethernet, Fibre Channel, etc.).

In an embodiment, the cloud platform system 160 may be representative of a system generally arranged to provide application developers with accelerated development, deployment, orchestration, and management of their container applications 136 and/or native applications 138. For example, the cloud platform system 160 may provide application developers with the functionality to rapidly design, create, build, test, and/or deploy their container applications 136 and/or native applications 138 to the respective infrastructure services provider systems 116. The services of the deployed container applications 136 and/or native applications 138 may then be accessed or used by the application developer's customers, clients, or consumers via their systems (e.g., consumer system 106).

In an embodiment, the one or more container applications 136 and/or native applications 138 may also implement a microservice architecture, where the structures of an application may be implemented as a set of individual microservices that are separated and organized by their discrete functions. In an embodiment, the individual microservices may be implemented with a variety of programming languages (e.g., Java, JavaScript, C #, C++, Python, PHP, Ruby, Go, Perl, and Erlang, Nodejs, Elixir, etc.) and may be communicatively and/or operatively coupled to each other via distributed messaging systems (e.g., APACHE Kafka, PIVOTAL RabbitMQ, etc.) and overlay networks (e.g., flannel, WEAVE Net, Project Calico, etc.) to collectively provide the functionalities of the application. The individual microservices may also be independently built, tested, and deployed to facilitate continuous integration (CI) and continuous delivery (CD) software development and information technology operations (DevOps) paradigm(s).

In an embodiment, the cloud platform system 160 may also provide application developers with the functionality to continuously update, build, test, and deploy their container applications 136 and/or native applications 138 including one or more individual microservices to the respective infrastructure services provider systems 116. Additionally or alternatively, the cloud platform system 160 may further provide telemetry information (e.g., metrics, logs, etc.) to the application developers and enable application developers to manage authentication, authorization, and access control of their container applications 136 and/or native applications 138.

To enable these and other functionalities, the cloud platform system 160 may include one or more platform server devices 164 generally arranged to host an AADDOMA 162. In an embodiment, the AADDOMA 162 may be configured to provide these functionalities to the application developers via one or more command line interfaces (CLIs) and/or graphical user interfaces (GUIs), which may include, without limitation, web-based GUIs, client-side GUIs, or any other GUI that provide these functionalities to an application developer. In addition to CLIs and GUIs, the AADDOMA 162 may be further configured to provide one or more programmatic interfaces (e.g., Application Programming Interfaces (APIs), etc.) accessible by the application developers via customized applications, CLIs, and/or GUIs. In an embodiment, the APIs may be designed in accordance with one or more programming paradigms (e.g., Design-by-Contract (DbC), etc.).

In an embodiment, the application development system 102 may be representative of an example system of individuals, corporations, organizations or other entities for the development of applications hosted by the infrastructure services provider systems 116. The application development system 102 may include, without limitation, one or more development devices 104 (e.g., development devices 104-1, 104-2, 104-3, etc.) used by application developers to develop various applications including, for example, their associated microservices (if any).

For example, the one or more development devices 104 may be representative of workstations used by application developers to create one or more container applications 136 and/or native applications 138. Continuing with the example, the one or more development devices 104 may also include, without limitation, various software development applications such as, for example, one or more source code editors, compilers, linkers, debuggers, source code analyzers, source code management systems, asset repositories, and/or Integrated Development Environments (IDE).

In an embodiment, the one or more development devices 104 may further include one or more CLI and/or GUI based applications configured to communicate and utilize the various functionalities provided by the AADDOMA 162 via network 150. For example, the one or more development devices 104 may be configured to determine application creation configuration information based on one or more answers to questions provided by application developers via a CLI and/or GUI based application (e.g., application orchestration client application 214 further discussed in FIG. 2). Continuing with the previous example, the CLI based application may be operatively and communicatively coupled to the one or more programmatic interfaces of the AADDOMA 162 and transmit the application creation configuration information to the AADDOMA 162. The AADDOMA 162 may receive application creation configuration information from the one or development devices 104. And in response, the AADDOMA 162 may create, build, test, and deploy one or more container applications 136 and/or native applications 138 to a designated infrastructure services provider system such as infrastructure services provider system 116-1. In an embodiment, the application creation configuration information may be determined using just a few pieces of data, which can be obtained from the application developer by asking simple questions, such as software architecture information of the application and the development stack information associated with the application. Once deployed, the container applications 136 and/or native applications 138 may execute on the infrastructure services provider system 116-1 and provide services to the consumer system 106.

It may be appreciated that by using the AADDOMA 162, application developers may continuously deploy their applications with certainty and consistency validated by built in, frequent, recurring, automated, and configurable testing. By using the AADDOMA 162, extensive knowledge and modifications of existing solutions are no longer necessary to create and deploy applications to infrastructure services providers. Moreover, the AADDOMA 162 may provide application developers with a base infrastructure that is scalable and responsive, and available when needed. The AADDOMA 162 may also allow application developers to assess the performance of their applications and provide proactive triggers. The AADDOMA 162 may further ensure that the application developers have controlled access and that their applications are protected. These are merely a few of the benefits of the AADDOMA 162, as further benefits and advantages will be further discussed.

In an embodiment, the consumer system 106 may be representative of typical consumer devices used by clients, consumers, developers, and/or other end users of a deployed application. In particular, the consumer system 106 may include one or more consumer devices 108 (e.g., consumer devices 108-1, 108-2, 108-3, etc.) that may be operatively and/or communicatively coupled to the container applications 136 and/or native applications 138 to provide its end users with various services via network 150. For example, the one or more consumer devices 108 may be representative of Internet of Things (IoT) devices (e.g., Internet capable appliances, Internet capable thermostats, etc.), mobile devices (e.g., mobile phones, tablets, laptop computers, etc.), embedded devices (e.g., 3D printers, home security devices, vehicle navigation devices, etc.), computing devices (e.g., workstations, desktop computers, etc.) or any other electronic devices that rely on the services provided by the one or more container applications 136 and/or native applications 138.

In an embodiment, the infrastructure services provider systems 116 may be representative of various data centers of cloud computing services providers (e.g., MICROSOFT Azure, AMAZON Web Services, GOOGLE Compute Engine, ALIBABA Cloud, etc.), each implementing a variety of protocols (e.g., Hyper Text Transfer Protocol (HTTP), HTTP Secure (HTTPS), etc.), standard formats (e.g., JavaScript Object Notation (JSON), Extensible markup Language (XML), etc.), and/or APIs (e.g., MICROSOFT Services Management APIs, AMAZON Elastic Compute Cloud APIs, GOOGLE Cloud JSON APIs, etc.). Additionally or alternatively, in some embodiments, the infrastructure services provider systems 116 may be representative of data centers internal or external (e.g., DATAPIPE data centers, etc.) to an application developer's organization configured to provide cloud computing services.

In some embodiments, the infrastructure services provider systems 116 may be geographically separated (e.g., separate physical locations, etc.) and virtually separated (e.g., separate network domains, etc.). In other embodiments, the infrastructure services provider systems 116 may be substantially geographically co-located (e.g., in substantially the same physical location, etc.) and virtually connected (e.g., in the same network domain, etc.). Alternatively, in some embodiments, the infrastructure services provider systems 116 may be geographically separated yet virtually connected or substantially geographically co-located yet virtually separated.

In an embodiment, the infrastructure services provider systems 116 may optionally include one or more load balancer devices 118 operatively and communicatively coupled to the respective server devices 122 and 124. The load balancer devices 118 and server devices 122 (or server devices 124) may also be operatively and/or communicatively coupled to each other via one or more internal networks (not shown) to facilitate communications between the server devices 122 (or server devices 124) and the load balancer devices 118.

To achieve a high degree of availability and responsiveness, and prevent any system, application, and/or component from becoming a single point of failure, the load balancer devices 118 may be generally configured to route or distribute incoming network traffic among multiple server devices 122, guest operating systems 132, and/or container applications 136 and/or native applications 138. The routing and distribution of incoming requests may be determined based on network and transport layer protocols (e.g., port number, IP address, etc.) and/or application layer data (e.g., HTTP header, Uniform Resource Identifier (URI), etc.). Additionally or alternatively, the routing and distribution of incoming requests may be further determined based on the availability, computational load, and/or network load of the server devices. Additionally or alternatively, the routing and distribution of incoming requests may also be determined based on responsiveness of the one or more applications 136 and 138.

For example, the load balancer devices 118 may be configured to route and distribute an incoming HTTP request received from a consumer device (e.g., consumer device 108-1, 108-2, 108-3, etc.) via network 150 to an appropriate server device (e.g., server device 122-1) that hosts a container application or a native application configured to process and/or respond to the incoming HTTP/HTTPS request. The appropriate server device may be determined by the load balancer devices 118 based on the HTTP header of the HTTP request and associated Uniform Resource Identifier. Additionally, the appropriate server device may be further determined by the load balancer devices 118 based on the availability, computational load, and/or network load of the server devices that hosts the container applications 136 and/or the native applications 138 configured to process and/or respond to the incoming HTTP request.

It may be appreciated that while load balancer devices 118 are illustrated as separate devices in FIG. 1, at least a portion of the functionality of the load balancer devices 118 may be performed by a load balancer application (not shown). For example, instead of the one or more load balancer devices 118 performing the functionalities discussed above, a load balancer application (e.g., AMAZON Elastic Load Balancer, GOOGLE Cloud Load Balancer, etc.), which may be implemented as one or more container applications 136 and/or native applications 138 deployed and executed by the one or more server devices 122 and/or 124. In some embodiments, the load balancer application may be configured to implement some or even all the functionalities of the load balancer devices 118. Thus, in some embodiments, the load balancer application may be configured to receive incoming network traffic and route or distribute incoming network traffic among multiple server devices 122, guest operating systems 132, and/or container applications 136 and/or native applications 138.

In an embodiment, each of the server devices (e.g., server device 122-1) of an infrastructure services provider system 116-1 may generally include, without limitation, a virtual machine monitor (VMM) (e.g., VMM 128), which may be configured to execute directly on the server devices and manage the concurrent execution of one or more guest operating systems 132. For example, VMM 128 may be representative of a native or bare-metal hypervisor (e.g., VMWARE ESXi hypervisor, MICROSOFT Hyper-V hypervisor, KVM hypervisor, Proxmox hypervisor, etc.) configured to execute and manage multiple instances of guest operating systems 132 (e.g., MICROSOFT Windows Server, Ubuntu Server, Debian Linux, CentOS Linux, Red Hat Linux, Ubuntu Snappy, CoreOS, VMWARE Photon, etc.) on the server device 122-1.

In an embodiment, the server devices (e.g., server device 124-1) of infrastructure services provider system 116-2 may generally include, without limitation, a host operating system (e.g., host operating system 126-1), which may be further configured to execute a VMM (e.g., VMM 130). The VMM 130 may be a non-native hypervisor which may be configured to execute on a host operating system and manage the concurrent execution of one or more guest operating systems 132. For example, the host operating system 126 may be representative of a server based operating system (Ubuntu Server, MICROSOFT Windows Server, etc.) and the VMM 130 may be representative of a non-native hypervisor (e.g., VMWARE Work Station, VirtualBox, CANONICAL LXD Container Hypervisor, etc.) configured to execute on the host operating system 126 and manage multiple instances of guest operating systems 132 (e.g., Windows Server, Ubuntu Server, Debian Linux, CentOS Linux, Red Hat Linux, Ubuntu Snappy, CoreOS Container Linux, VMware Photon, etc.) on the server device 124-1.

In an embodiment, the one or more guest operating systems 132 may be generally configured to execute one or more container engines 134 (e.g., Docker Container Engine, rkt Container Engine, etc.) and one or more native applications 138. In an embodiment, each of the one or more container engines 134 may be configured to host and manage the execution of one or more container applications 136 within one or more container instances, where each container instance (not shown) may execute a container application in its own isolated runtime environment. In an embodiment, each container instance may include, without limitation, a container operating system (OS), one or more container applications, and associated container components (e.g., executable binaries, support libraries, etc.) to support the execution of the one or more container applications. In an embodiment, each container instance may be created and hosted by the container engine 134 based on a container application image, which may include, without limitation, the container OS image, the container application(s), and associated container components. Thus, the container applications 136 may be hosted and managed by the one or more container engines 134 and defined by its associated container application images. In an embodiment, each container engine of the one or more container engines 134 may also be configured to host and manage the execution of one or more container applications created and deployed by the AADDOMA 162.

In embodiments where the one or more container applications 136 are implemented using a microservices architecture, each container instance may be generally configured to host a microservice of a container application and its associated dependencies. In these embodiments, each container instance may also be configured to host its associated microservice in an isolated runtime environment, where each microservice may be operatively and communicatively coupled to each other to collectively provide services of a particular container application.

In an embodiment, the native applications 138 may include one or more applications that share a common execution environment with a container engine and other native applications 138 in a guest operating system. In an embodiment, the native applications 138 may also include one or more support applications that manage the deployment and execution of the one or more container applications 136 in a container engine of a guest operating system. In an embodiment, the native applications 138 may also include one or more native applications created and/or deployed by the AADDOMA 162.

In an embodiment, container applications 136 and/or native applications 138 may interact with one or more existing services separate from the application during execution. Each service may publish an endpoint accessible by the application, for example in the form of an API. To create and deploy an application as discussed above, the application creation configuration information used by AADDOMA 162 may include API configuration information for each service that contains information required to connect to and invoke the service as further discussed with respect FIG. 6.

Figure 2:
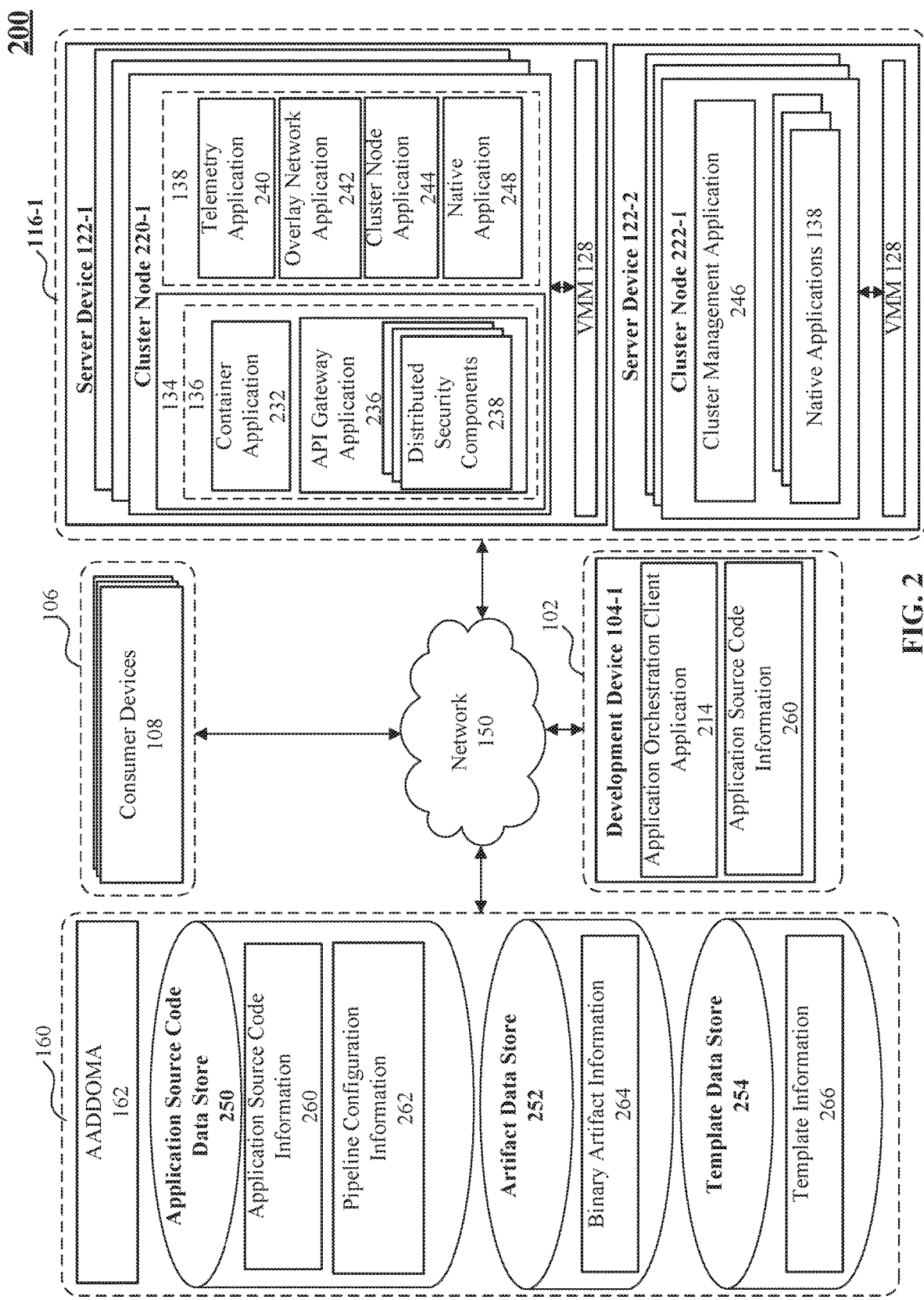
FIG. 2 illustrates another block diagram of the AADDOMS in an example embodiment.

FIG. 2 illustrates another block diagram of the AADDOMA 162 configured to create, build, test, and deploy one or more applications in an example embodiment 200. For example, to create an application with a customizable development, testing, and deployment pipeline, the development device 104-1 may include an application orchestration client application 214 and application source code information 260 may generally include source code for the application and application build configuration for the application.

In an embodiment, the application orchestration client application 214 may be configured to authenticate the application developer based on user authentication information (e.g., login name and password, access token, etc.) provided by the application developer. Once authenticated, the application orchestration client application 214 may employ the AADDOMA 162 to retrieve available developer information representative of common configuration preferences and defaults associated with the application developer identified by their authentication information. Alternatively, the application orchestration client application 214 may be representative of a terminal emulator (e.g., PuTTY, etc.), a Secure Shell client (e.g., OpenSSH, etc.), or a web browser (e.g., GOOGLE Chrome, etc.) configured to connect to AADDOMA 162 via one or more secure protocols (e.g., Secure Shell (SSH) protocol, Hyper Text Transfer Protocol Secure (HTTPS), etc.).

In an embodiment, based on the available developer information retrieved by AADDOMA 162, the application orchestration client application 214 may be configured to present the application developer with one or more questions via a CLI and/or a GUI. In an embodiment, the questions may elicit responses for at least a portion of the application creation configuration information. In an embodiment, the remaining portion of the application creation configuration information may be automatically generated either based on the responses, based on available developer information, or a combination of both. In an embodiment, the application creation configuration information may generally include information that the AADDOMA 162 may use to create, build, test, and deploy an application to an infrastructure services provider system (e.g., infrastructure services provider system 116-1). Additionally, the questions presented to the application developer may be appropriately ordered and may omit any available developer information previously queried.

In an embodiment, the appropriate order of questions to present to an application developer for the creation of an application may include the following order: (1) a name, version, and/or description associated with the application, (2) a location of a data store for storing and/or accessing the application's source code and associated application source code access information (e.g., an API access token, login name and password, etc.) for accessing the data store, (3) one or more programming language(s) associated with the application (e.g., Java, JavaScript, C #, C++, Python, PHP, Ruby, Go, Perl, and Erlang, Node.js, Elixir, etc.) (4) one or more data store(s) associated with the application (e.g., MySQL, MongoDB, InfluxDB, etc.), (5) one or more application source code generation automation options, (6) one or more application build configuration options, and (7) one or more application deployment locations.

In an embodiment, the application creation configuration information may include, without limitation, the location of an application source code data store configured to store application source code information, application source code access information for accessing private application source code data stores, a deployment location of the application, a name of the application, a brief description of the application, creator's name for the application, the creator's credentials (e.g., creator's email address, creator's full name, creator's phone number, creator's organization title, etc.) associated with the application, version information for the application, an organization associated with the application, the software architecture information of the application, the development stack information associated with the application, at least one application template name that identifies a code template used to generate the initial source code for the application, or any combination of thereof.

In an embodiment, the location of the application code data store may identify either a public or a private application code data store in a source code hosting facility (e.g., Github, Gitlab, etc.). Additionally, in embodiments with private application source code data stores, AADDOMA 162 may be configured to access the private application source code data store with application developer provided application source code access information (e.g., an API access token, login name and password, etc.). Alternatively, in embodiments where the application developer did not identify a location of an application source code data store for the application, the AADDOMA 162 may be configured to create a private application source code data store 250 for the application within the cloud platform system 160.

In an embodiment, the development stack information associated with the application may generally identify the operating system, the runtime environment, the dependences, and/or the programming language used and relied upon by the application to be created by the AADDOMA 162. For example, the development stack may identify a Linux operating system, with an Apache web server, a MySQL database, and JavaScript with node.js as the runtime environment.

In an embodiment, the application source code data store 250 may be generally configured to store the source code for an application (i.e., application source code information 260). In an embodiment, the application source code data store 250 may be further configured to store one or more workflows configured to continuously integrate, test, and/or deploy the application, which may be represented as pipeline configuration information 262.

In an embodiment, the pipeline configuration information 262 may include, without limitation, integration workflow information that defines an integration workflow and testing workflow information that defines a testing workflow. In an embodiment, the pipeline configuration information may also define the one or more workflows in a domain-specific language (DSL) in order to provide application developers with maximum flexibility and simplicity when customizing the integration and testing workflows. In an embodiment, the pipeline configuration information 262 may further include, without limitation, infrastructure creation information that defines an infrastructure creation workflow and deployment configuration information that defines a deployment workflow.

In an embodiment, the cloud platform system 160 may further include an artifact data store 252 (e.g., SONATYPE Nexus, JFROG Artifactory, etc.) configured to store binary artifacts represented as binary artifact information 264. In an embodiment, the binary artifacts information may be generated and stored in the artifact data store 252, when the application is built based on the pipeline configuration information 262. In an embodiment, the binary artifact information may include, without limitation, a native application package and/or container application image of the built application.

In an embodiment and based at least partially on the available developer information and/or application creation configuration information, the AADDOMA 162 may be generally configured to perform the initial creation and deployment of an application. To perform the initial creation and deployment of an application, the AADDOMA 162 may be generally configured to: (1) provision an application source code data store (e.g., application source code data store 250) configured to store application source code information (e.g., application source code information 260); (2) generate application source code information based on an identified application template stored in a template data store (e.g., template information 266 stored in template data store 254); (3) store the generated application source code information (e.g., application source code information 260) in the provisioned application source code data store (e.g., application source code data store 250); (4) validate the location of the artifact data store (e.g., artifact data store 252) configured to store binary artifact information (e.g., binary artifact information 264); (5) create and configure an integration workflow and testing workflow for the application; (6) build the application source code information to create an initial set of binary artifacts for testing and deployment; (7) store the initial set of binary artifacts for the application in the artifact data store; (8) test the initial set of binary artifacts and generate test results; (9) optionally provision an application infrastructure (e.g., a cluster including cluster node 220-1 and cluster node 222-1, etc.) within the designated infrastructure services provider system (e.g., infrastructure services provider system 116-1); and/or (10) deploy the application (e.g., custom container application 232, custom native application 248) to an existing or newly created application infrastructure in the designated infrastructure services provider system (infrastructure services provider system 116-1).

In an embodiment, instead of the AADDOMA 162 being configured to generate application source code information as discussed immediately above in (3), the application orchestration client application 214 may be configured to locally generate the application source code information (e.g., application source code information 260 of development device 104-1) based on an identified application template stored in a template data store (e.g., template information 266 stored in template data store 254). Continuing with the above embodiment, after locally generating application source code information, the application orchestration client application 214 may be configured to upload or transmit the generated application source code information (e.g., application source code information 260) to the application source code data store (e.g., application source code data store 250), where the AADDOMA 162 may be configured to: (4) validate the location of the artifact data store; (5) create workflows for the application; (6) build the application source code information; (7) store the initial set of binary artifacts for the application; (8) test the initial set of binary artifacts and generate test results; (9) optionally provision an application infrastructure; and/or (10) deploy the application (e.g., custom container application 232, custom native application 248, etc.) to an existing or newly created application infrastructure as discussed above with respect to AADDOMA 162.

In an embodiment, the AADDOMA 162 may also be configured to roll back or reverse any changes made during the initial application creation process when a failure condition is detected. In an embodiment, a failure condition may include, without limitation, a failure to create an asset during the build and deployment of the application. In an embodiment, the asset may include any resource or package of files generated during the build and deployment of the application, which may include scripts, files, file archives, packages, binaries, container images, test applications, and/or the like. In such embodiments, the AADDOMA 162 may be generally configured to remove the generated build artifacts and roll back or reverse any modifications made during the initial creation and deployment of an application.

In an embodiment, the AADDOMA 162 may also be configured to provide application creation status information to the application developer via the application creation client application 214. In an embodiment, the various components of the AADDOMA 162 may generate events and provide progress information indicating the creation and deployment progress of the one or more stages performed by the AADDOMA 162 to create and deploy an application. The progress information may include, without limitation, the stage information indicating the current stage of the application creation and deployment, the time stamp information associated with the status information, and the status information indicating whether the current status is "in progress," "delayed," "waiting," "complete," "failed," or "unknown." In an embodiment, the progress information may be provided in a CLI or visually presented in a GUI (e.g., a progress bar, etc.) in real-time to the application developers via the application orchestration client application 214.

In an embodiment, after the initial application has been created and deployed to an infrastructure services provider system, the application developer may update the application by making changes to the source code of the application (i.e., the application source code information 260) on their development device 104-1. These changes may then be transmitted and stored in the application source code data store (e.g., application source code data store 250). In order to continuously integrate and test these changes and deploy an updated application that incorporate these tested changes, the AADDOMA 162 may be further configured to automatically: (1) detect changes or updates in the application source code data store (e.g., application source code data store 250) indicating an update to the application source code information; (2) build the application source code information to create a set of binary artifacts representative of at least a portion of the updated application for testing and deployment; (3) test at least a portion of the updated application based on one or more configured tests; (4) store the binary artifacts in the artifact data store; (5) detect changes in the artifact data store or receive an event to start the deployment of at least a portion of the updated application; and/or (6) deploy at least a portion of the updated application.

In an embodiment, AADDOMA 162 during the initial creation and deployment of an application may be configured to provision an application infrastructure to host the deployed application. To provision the application infrastructure, the AADDOMA 162 may be configured to create a cluster that includes two or more cluster nodes such as cluster nodes 220-1 and 222-1 on one or more server devices such as server devices 122-1 and 122-2, respectively. In an embodiment, the created cluster may include at least one master cluster node such as cluster node 222-1 that includes a guest OS (e.g., guest OS 132) configured to execute one or more applications that manage one or more slave cluster nodes. In an embodiment, the created cluster may also include at least one slave cluster node such as cluster node 220-1 that includes a guest OS (e.g., guest OS 132) configured to execute one or more applications that communicate with a master cluster node and manages the execution of one or more container applications (e.g., container applications 136, etc.) and/or native applications (e.g., native applications 138, etc.) of the slave cluster node. It may be appreciated that the number of cluster nodes and the topology of the cluster nodes may vary based on the application creation configuration information determined based on answers to questions from the application developer.

In an embodiment, the created cluster may include at least one cluster node 222-1 as a master cluster node. In this embodiment, the cluster node 222-1 may be generally configured to manage one or more slave cluster nodes such as cluster node 220-1 in a cluster. To achieve these and other functionalities, the guest OS (e.g., guest OS 132) of a master cluster node such as cluster node 222-1 may be generally configured to execute, among other native applications 138, cluster management application 246. In an embodiment, the cluster management application 246 may be generally configured to enable the management of the cluster by the AADDOMA 162 via one or more APIs, monitor the availability and status of one or more slave cluster nodes, manage the scheduling of execution of one or more container applications 136, and/or native applications 138 on the one or more slave cluster nodes, and scale the execution of the one or more applications on the one or more slave cluster nodes.

In an embodiment, the created cluster may also include at least one cluster node 220-1 as a slave cluster node. In this embodiment, the cluster node 220-1 may be generally configured to communicate with a master cluster node such as cluster node 222-1 and manage the execution of one or more container applications 136, and/or native applications 138 of the slave cluster node in a cluster node. To achieve these and other functionalities, the guest OS (e.g., guest OS 132) of a slave cluster node such as cluster node 220-1 may be generally configured to execute, among other native applications, a cluster node application 244 configured to maintain communication with the cluster management application 246 and provide status information to the cluster management application 246. To manage the execution of one or more applications (e.g., container applications 136 and/or native applications 138, etc.) on the cluster node 220-1, the cluster node application 244 may be configured to initiate, monitor, and maintain the execution of one or more applications (e.g., container applications 136 and/or native applications 138, etc.) in accordance with management and scheduling as determined by the cluster management application 246 of the master cluster node, i.e., cluster node 222-1.

In an embodiment and during the initial creation of a cluster for an application, the AADDOMA 162 may be generally configured to deploy a telemetry application 240, an overlay network application 242, and a cluster node application 244 to the one or more cluster nodes (e.g., slave cluster nodes). In an embodiment, the telemetry application 240 may be generally configured to monitor health of the one or more container applications 136, native applications 138 and/or associated infrastructure by collecting metrics (e.g., application CPU usage, application memory usage, application network utilization, request queue depth, request response time, etc.) and logs (e.g., error logs, API access logs, etc.) associated with and/or generated by the one or more container applications 136 and/or native applications 138. In an embodiment, the overlay network application 242 may be generally configured to provide an overlay network (e.g., flannel, Weave Net, etc.) to facilitate secure communications between and among one or more applications (e.g., custom container application 232, custom native application 248, container applications 136, and/or native applications 138, etc.) in a cluster.

In an embodiment and during the initial creation of a cluster for an application, the AADDOMA 162 may be generally configured to deploy the newly created container application 232 and optionally, an API gateway application 236 to a slave cluster node (e.g., cluster node 220-1). In an embodiment, the optional API gateway application 236 may be generally configured to provide one or more public and/or private APIs that may be handled by the newly created container application 232. In an embodiment, the optional API gateway application 236 may also include distributed security components 238 that may be configured to provide authentication, authorization, access control, and/or accounting services to the one or more APIs managed by the API gateway application 236.

In embodiments where the one or more applications is implemented using a microservices architecture, the individual microservices may be distributed to one or more cluster nodes (e.g., one or more slave cluster nodes such as cluster nodes 220-1 . . . 220-n). Additionally, the microservices may utilize the overlay network application 242 and the API gateway application 236 in one or more cluster nodes to collectively provide the services of an application.

Figure 3:
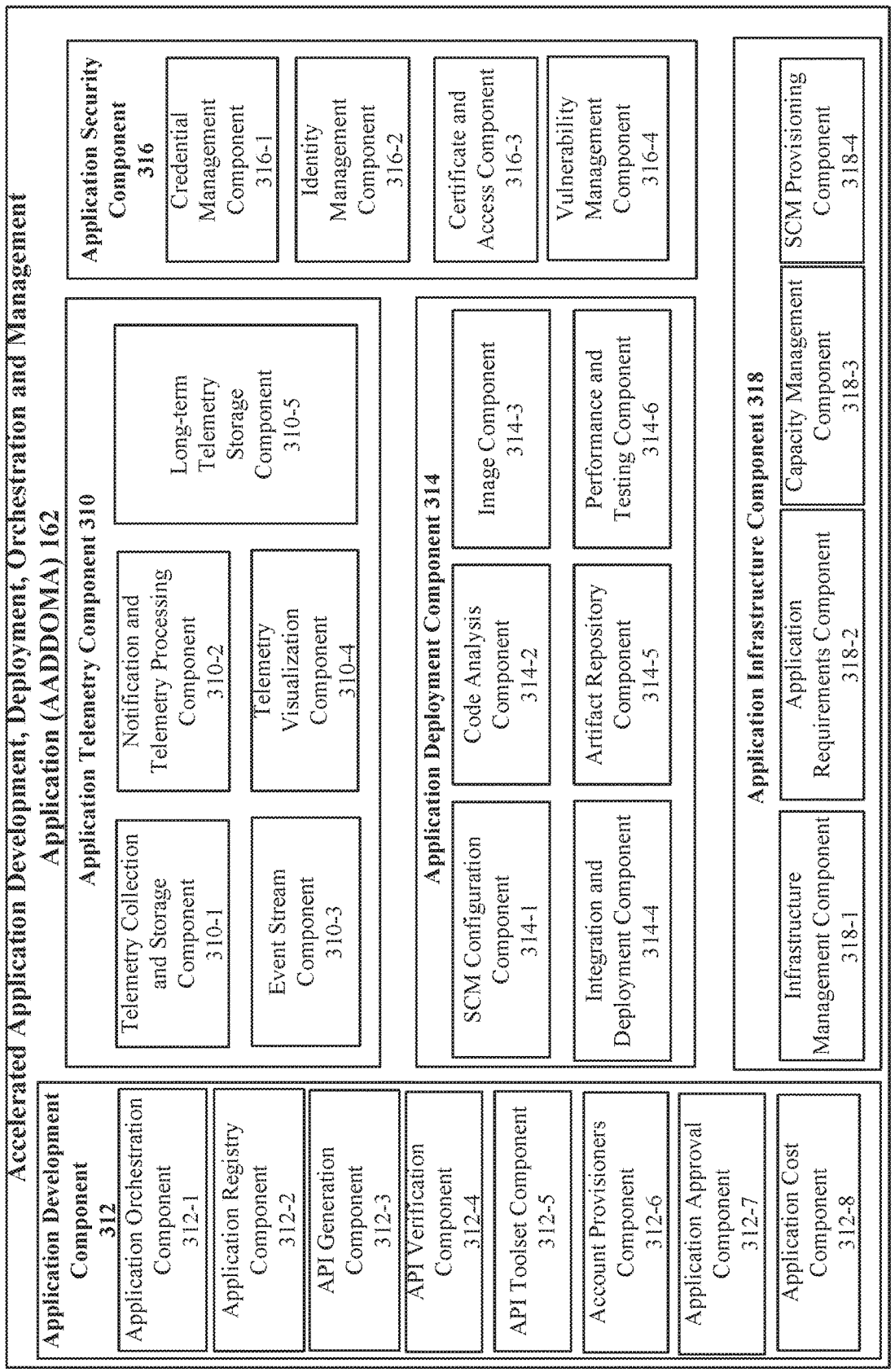
FIG. 3 illustrates a block diagram of the various components of the Accelerated Application Development, Deployment, Orchestration, and Management Application (AADDOMA) according to an example embodiment.

FIG. 3 illustrates a block diagram of the various components of the accelerated application development, deployment, orchestration, and management application according to an example embodiment 300. In FIG. 3, AADDOMA 162 may include, without limitation, application development component 312, application telemetry component 310, application deployment component 314, application security component 316, and application infrastructure component 318.

In an embodiment, the application development component 312 may generally include, without limitation, application orchestration component 312-1, application registry component 312-2, API generation component 312-3, API verification component 312-4, API toolset component 312-5, account provisioners component 312-6, application approval component 312-7, and application cost component 312-8. These components may be operatively and/or communicatively coupled to each other and generally configured to: (1) create, orchestrate, and manage applications and associated components (e.g., data stores, cluster nodes, APIs, etc.) based on application creation configuration information received from application developers; (2) determine application requirements information and application cost information; and/or (3) provide notifications to organizations for applications approval and/or changes prior to deployment of the application.

In an embodiment, the application orchestration component 312-1 may be generally configured to facilitate the creation of a variety of different types of applications (e.g., custom container application 232, custom native application 248, etc.) based on application creation configuration information. In an embodiment, the application orchestration component 312-1 may be generally configured to determine the application creation configuration information by providing one or more questions to an application developer and receiving one or more responses from the application developer via application orchestration client application 214. Once the application creation configuration information is determined, the application orchestration component 312-1 may be further configured to perform the initial creation and deployment of the application as previously discussed with respect to FIG. 2.

In an embodiment, the application orchestration component 312-1 may also be generally configured to generate application requirements information based on the application creation configuration information. The application requirements information may include a set of values that define how the application will be created, built, tested, deployed, and/or managed. In an embodiment, the list of requirements may also be implemented in a domain-specific language (DSL).

In an embodiment, the application orchestration component 312-1 may be further configured to generate application source code information (e.g., application source code information 260) and pipeline configuration information (e.g., pipeline configuration information 262) based on the application creation configuration information. The application source code information may generally include, without limitation, the source code of the application to be created and application build configuration of the application to be created (e.g., makefiles, etc.).

In an embodiment, the pipeline configuration information may also include, without limitation, integration workflow and testing workflow configured to facilitate continuous integration of the application to be created and the frequent, recurring, automated, and configurable testing of the created application. The pipeline configuration information may further include an infrastructure creation workflow configured to facilitate the creation of a new cluster (if needed) and a deployment workflow configured to facilitate deployment of the created and tested application to the newly created cluster or an existing cluster as designated by the application developer.

In an embodiment, the application orchestration component 312-1 may also be generally configured to provide the generated application requirements information to the application requirements component 318-2 to determine the application resource information which may include, without limitation, the number of cluster nodes required for an application, and the number of container instances to be hosted by the cluster nodes for the application. The application orchestration component 312-1 may also be generally configured to provide the application resource information and application creation configuration information to the application cost component 312-8 to determine application cost information. The application cost information may generally include an itemized Total Cost of Ownership (TCO) estimate associated with creating, deploying, and/or managing the application.

In an embodiment, the itemized TCO estimate may include, without limitation, one or more costs associated with: (1) hosting and managing the application developer's application within an infrastructure services provider system, (2) underlying operational activities associated with the hosted application (e.g., network traffic, other resources billed by bandwidth or storage volume, etc.) in the infrastructure services provider system, (3) third party applications and/or components integrated with the application developer's application, (4) additional and optional third party application integrated with the application developer's application, (5) development, testing, and maintenance of the AADDOMA 162, and/or (6) additional levels of technical support in creating, building, testing deploying, and/or managing the application developer's application.

In an embodiment, the application registry component 312-2 may be generally configured to manage and visually present a data store of indices of an application developer's applications and associated components (e.g., data stores, common AADDOMA 162 applications and components, etc.). In an embodiment, the application registry component 312-2 may be updated when an application developer creates a new container application or new native application. In an embodiment, the application registry component 312-2 may be generally configured to store links or references to information for one or more applications and associated components. The information may include, without limitation, location of endpoints of an application and/or associated components for retrieval of telemetry information, mappings for retrieval of configuration information, deployment versions and identifier of the application and/or associated components, endpoints of the application and/or component to facilitate interaction with other applications and/or components.

In an embodiment and with continued reference to the application registry component 312-2, the indexed or referenced applications may be visually presented in one or more views (e.g., one or more GUI views visually presented in a web browser). In an embodiment, the one or more views may include, without limitation, a customizable application developer view and a cloud platform view. In an embodiment, the one or more views may be generally arranged to visually present the different applications, associated components of applications, and relationships between the applications and associated components as one or more graphical elements (e.g., nodes and links, etc.) that may represent application developer's applications, associated applications and components, data stores, network communications, API endpoints, and/or the like.

In an embodiment and with continued reference to the application registry component 312-2, the application developer view may be generally arranged to visually present the applications, associated components of the applications, and their relationships based on, for example, the organizational hierarchy (e.g., business units, design teams, etc.) of an application developer's organization. In an embodiment, the cloud platform view may be generally arranged to present the application developer view with different applications associated components of the applications, and their relationships based on, for example, the dependencies (e.g., data dependency, etc.) between the applications and associated components.

In an embodiment, the application registry component 312-2 may also be generally configured to enable the addition of descriptive information to the graphical elements that represent an application or an associated component of the application in one or more views. In this embodiment, the descriptive information and its associated application or component may be stored in a data store as key-value pairs. In an embodiment, the one or one or more views may also be visually customized and linked.

In an embodiment, the API generation component 312-3 may be generally configured to generate API specifications information and generate one or more APIs exposed by an API gateway for an application developer's application (e.g., custom container application 232, custom native application 248) in accordance with one or more programming paradigms (e.g., DbC, etc.). In an embodiment, the API generation component 312-3 may be configured to provide an API gateway via an API gateway application (not shown), where the API gateway application may be an existing API gateway application managed by the AADDOMA 162 (not shown) or an application developer's own API gateway application (e.g., API gateway application 236) deployed with the application.

In an embodiment, the API gateway may be generally configured to provide distributed rate limiting, authentication, authorization, access control, and/or accounting to manage and/or monitor access of one or more APIs exposed by the API gateway. In an embodiment, the API gateway may be configured to expose and aggregate multiple generated APIs behind a single Domain Name System (DNS) name. In an embodiment, each generated API may also be operatively connected to one or more endpoints of the application developer's created and deployed application.

In an embodiment, the API verification component 312-4 may be generally configured to create automated API test applications based on the API specifications information for one or more APIs exposed by an API gateway. The API test applications may be configured to validate the one or more APIs in accordance with the API specifications information and one or more programming paradigms (e.g., DbC, etc.). For example, the API test applications may validate the one or more APIs based on specific and agreed upon preconditions, post-conditions for each function of an API and validate all functions of the API based on general rules or invariants that govern the API. Additionally or alternatively, the API gateway hosted by an API gateway application itself may be configured to validate the one or more APIs during runtime in accordance with the API specifications information and one or more programming paradigms (e.g., DbC, etc.).

In an embodiment, the API toolset component 312-5 may be configured to provide one or more APIs for common AADDOMA 162 applications and/or components (e.g., event publisher components, event listener components that interface with the event stream component 310-3, etc.) that may be deployed with the application developer's application (e.g., custom container application 232, custom native application 248). The API toolset component 312-5 may be configured to create, manage, and register one or more services within an API gateway hosted by an API gateway application for the one or more common AADDOMA 162 applications and/or components.

In an embodiment, the account provisioners component 312-6 may be generally configured to manage accounts associated with one or more users (e.g., application developers of an organization, DevOps engineers of an organization, managers of an organization, reviewers of an organization, executives of an organization, etc., etc.) of the AADDOMA 162 for one or more organizations. In an embodiment, the account provisioners component 312-6 may be generally configured to create one or more accounts for the one or more users of the AADDOMA 162 and manage user authentication information associated with each user account. In an embodiment, the account provisioners component 312-6 may also be configured to manage common configuration preferences and defaults for the one or more users such as application developers (e.g., developer information) and/or one or more users within a particular organization.

In an embodiment, the application approval component 312-7 may be generally configured to elicit approval from organizations before the creation and/or deployment of an application and provide organizations with the ability to control the cost of creating, deploying, and/or managing applications in the AADDOMS 100. Additionally or alternatively, the application approval component 312-7 may also be generally configured to elicit approvals from an application developer's organization, when the application creation configuration information used to create an application substantially deviates from presets or defaults of an organization's application creation configuration information.

For example, the application approval component 312-7 may be configured to provide an approval notification (e.g., email notification, notification via an user interface (UI) element, etc.) to a designed user (e.g., manager of an organization, etc.) via a development device (e.g., development device 104-2, 104-3, etc.) to elicit an approval to create and/or deploy an application when a minimum number of cluster nodes required to host the application in an infrastructure services provider system substantially increases from the organization's default number of cluster nodes per application (e.g., greater than fifty (50) percent, seventy (70) percent, etc.). In response to receiving the elicited approval from the development device associated with the designated user, the application approval component 312-7 may be configured to enable the creation and/or deployment of the application.

In an embodiment, the application approval component 312-7 may be configured to provide application approval notifications to the application developer's organization: (1) after determining the application creation configuration information and application cost information but before creating an application; (2) after creating the application but before deployment of the application to the infrastructure services providers; and/or (3) after creating the application but before changing the configuration/scale (e.g., increases or decreases from the organization's default number of cluster nodes per application, etc.) of the application. The application approval notifications may include, without limitation, application cost information. The application cost information may include the costs associated with creating, deploying, and/or managing the application. In an embodiment, the application approval component 312-7 may be configured to enable organizations to provide approvals (or disapprovals) prior to creation of an application and/or deployment of an application in response to a particular application approval notification.

In an embodiment, the application cost component 312-8 may be generally configured to provide the application cost information to one or more components of the AADDOMA 162 (e.g., the application orchestration component 312-1) based on at least a portion of application requirements information generated by the application requirements component 318-2 and/or at least a portion of application creation configuration information for a particular application to be created and deployed. As previously discussed, the application cost information may generally include an itemized TCO estimate associated with creating, deploying, and/or managing the application.

In an embodiment, the application deployment component 314 may generally include, without limitation, source code management (SCM) configuration component 314-1, code analysis component 314-2, image component 314-3, integration and deployment component 314-4, artifact repository component 314-5, and performance and testing component 314-6. These components may be operatively and/or communicatively coupled to each other and generally configured to: (1) provide an integration and testing workflow to continuously integrate, test, and deploy an application; (2) perform code analysis on the application source code and provide code analysis information to the application developers and their organization; and (3) enable the modification of the testing workflow to include test logic gates and provide testing as a service.

In an embodiment, the SCM configuration component 314-1 may be generally configured to enable the creation and/or provisioning of application source code data store (e.g., application source code data store 250) for storing application source code represented as application source code information (e.g., application source code information 260). The SCM configuration component 314-1 may be generally configured to provision an application source code data store in a public or private source code hosting facility (e.g., GitHub, GitLab, etc.) in response to receiving a request from the application orchestration component 312-1 during the initial creation and deployment of an application.

In an embodiment, the code analysis component 314-2 may be generally configured to perform code analysis (e.g., static code analysis using SonarQube, COMPUWARE Topaz, Twistlock, etc.) to analyze the application source code information (e.g., application source code information 260) stored in an application source code data store (e.g., application source code data store 250) in order to identify and report one or more errors in the source code (e.g., duplicate code, syntax errors, logic errors, memory leaks, security vulnerabilities, etc.). In an embodiment, the code analysis component 314-2 may be configured to analyze the application source code information and provide the code analysis information in response to a request to perform code analysis.

In an embodiment, the code analysis component 314-2 may be configured to perform code analysis: (1) immediately before and/or after the application source code information (e.g., application source code information 260) is built and tested; (2) during the application source code information build process and before the application is tested; or (3) after receiving a source code update event that indicates the application source code information has been updated in an application source code data store (e.g., application source code data store 250). Additionally or alternatively, the code analysis component 314-2 may be configured to automatically perform code analysis on a periodic basis (e.g., every hour, every eight (8) hours, every twenty-four (24) hours, etc.). In an embodiment, the code analysis component 314-2 may also be configured to provide the code analysis information to one or more application developers after performing a code analysis.

In an embodiment, the image component 314-3 may be generally configured to generate one or more container images that support the operation of a container application. The one or more container images may include, without limitation, one or more container OS images that are used to create a container instance hosted by a container engine (e.g., container engine 134) of a cluster node (e.g., cluster node 220-1 as a slave cluster node). The container OS images may generally include, without limitation, an image of an OS with customized configurations and a minimum amount OS services to support the execution of container applications and associated container components within a container instance.

In an embodiment, the integration and deployment component 314-4 may be an automation server configured to execute one or more customizable integration workflows and/or customizable testing workflows configured to automate the process of at least building and testing applications and facilitate the deployment of one or more applications in accordance to a deployment workflow. In an embodiment and during the initial creation of an application, the integration and deployment component 314-4 may be configured to create pipeline configuration information (e.g., pipeline configuration information 262) which may include, without limitation, integration workflow information that defines an integration workflow for the application and testing workflow information that defines a testing workflow for the application.

In an embodiment and with continued reference to the integration and deployment component 314-4, the created integration workflow may be configured to: (1) retrieve the application source code information (e.g., application source code information 260) from an application source code data store (e.g., application source code data store 250); (2) build or compile the retrieved application source code information; and (3) provide the output of the build process, i.e., binary artifacts information (e.g., binary artifact information 264) to the artifact repository component 314-5 for storage in an artifact data store (e.g., artifact data store 252), where the stored binary artifacts information may include, without limitation, the application built from the application source code information (e.g., application source code information 260); (4) test the built application with one or more testing applications in accordance with the testing workflow; and (5) generate testing result information that includes one or more test results from the execution of one or more test applications.

In an embodiment and after creating the pipeline configuration information, the integration and deployment component 314-4 may be configured to: (1) store the created pipeline configuration information (e.g., pipeline configuration information 262) in an application source code data store (e.g., application source code data store 250 that also stores the application source code information 260); (2) perform the one or more workflows of the pipeline configuration information to build and test the application; and (3) provide a deployment ready notification or generate a deployment ready event indicating that the application has successfully completed and passed testing workflow and the artifact data store 252 includes the application stored in a container application image for execution on container engines (e.g., container engines 134) or a native application package for installation and execution directly on a Guest OS (e.g., Guest OS 132) rather than on a container engine.

To enable at least continuous integration and testing, the integration and deployment component 314-4 may be further configured to: (1) detect changes or updates in the application source code data store (e.g., application source code data store 250) that indicate an update to the application source code information for an application; (2) retrieve the pipeline configuration information associated with the application source code information from the application source code data store; (3) perform the building and testing of the application in accordance with the retrieved pipeline configuration information; and (4) generate testing report information that includes one or more test results. Additionally or alternatively, the integration and deployment component 314-4 may be configured to automatically perform integration and testing on a periodic basis (e.g., every eight (8) hours, every twenty four (24) hours, etc.).

In an embodiment, the integration and deployment component 314-4 may also be configured to detect one or more binary repository update events during the execution or interpretation of the integration workflows and testing workflows. In response to the detection of binary repository update events, the integration and deployment component 314-4 may verify the set of generated build artifacts including an application for testing and initiate the execution or interpretation of the testing workflow to test the application.

In an embodiment, the integration and deployment component 314-4 may also be configured to generate a deployment ready event indicating that a container application image or native application package that includes the built and tested application has passed its associated testing workflow and is ready for deployment to an infrastructure services provider for use by clients, consumers, or customers of the application developer, which may be subsequently deployed by the infrastructure management component 318-1 to a provisioned or an existing cluster and accessible by consumer devices 108 via network 150.

In an embodiment and to determine the outcome of the deployment of an application, the integration and deployment component 314-4 may be generally configured to detect one or more deployment success events indicating the successful deployment of one or more applications to one or more designated clusters in an infrastructure services provider system. Additionally, the integration and deployment component 314-4 may also be configured to detect one or more deployment failure events indicating the failed deployment of one or more applications to one or more designated cluster in an infrastructure services provider system.

In an embodiment, the artifact repository component 314-5 may be generally configured to manage an artifact data store (e.g., artifact data store 252) and facilitate the storage of build artifacts represented as binary artifact information (e.g., binary artifact information 264) generated and used during integration and testing. In an embodiment and as previously discussed, the binary artifact information may include, without limitation, the native application package and/or container application image of the built application. In an embodiment, the artifact repository component 314-5 may also be configured to generate binary repository update events to report changes or updates to the binary repository.

In an embodiment, the performance and testing component 314-6 may be generally configured to modify the testing workflow information, manage one or more testing applications, and/or generate one or more test applications. In an embodiment, the one or more testing applications may be generally configured to perform testing of applications and components including one or more components of the AADDOMA 162 using various testing paradigms (e.g., black-box testing, grey-box testing, white-box testing, etc.) on individual components of an application (unit testing), multiple components of application (integration testing), and/or the entire application (system testing) with a variety of testing processes such as functional testing.

In an embodiment, the performance and testing component 314-6 may be configured to generate a test application based on API specifications information generated by the API generation component 312-3 for an application. In an embodiment, the generated test application may be configured to provide randomized input to the application to be tested via its APIs and monitor the responses for compliance with the API specifications information.

In an embodiment, the performance and testing component 314-6 may be configured to provide testing as a service by: (1) deploying the container application image or a package that includes the application to be tested to a development environment configured to simulate a production environment; (2) execute the generated test application to provide randomized input that simulates peak access patterns the application may experience via its APIs when the application is executing in a production environment; (3) monitor the responses of the container application to determine compliance with the API specifications information for the application; and (4) generate testing result information based on the determined compliance with the API specifications information for the application. In an embodiment, development environment may include, without limitation, one or more cluster nodes that are primarily used for testing the application and not used by the customers or clients of an application developer that created the application (e.g., users of one or more consumer devices 108). In an embodiment, the production environment may include, without limitation, one or more cluster nodes that are primarily used by the customers or clients of the application developer that created the application (e.g., users of one or more consumer devices 108).

In an embodiment, the performance and testing component 314-6 may be configured to modify a testing workflow of pipeline configuration information associated with an application to include, without limitation, testing as a service configured to deploy an application to a development environment for testing with input data and access patterns that simulate a production environment. Additionally or alternatively, the performance and testing component 314-6 may be further configured to enable the modification of the testing workflow of the pipeline configuration information associated with an application to include one or more test logic gates. The one or more test logic gates inserted into a testing workflow may be generally configured to control the progression through the testing workflow by the integration and deployment component 314-4 based on the test results of one or more test applications.

For example, the performance and testing component 314-6 may be configured to enable the insertion and configuration of a test logic gate in a testing workflow at the end of completion of one or more tests of the built application and prior to the deployment of the tested application to a cluster in an infrastructure services provider system. The inserted test logic gate may be configured to notify a designated user (e.g., DevOps Engineer, etc.) to provide manual approval at the end of the testing workflow before completion of the testing workflow and subsequent deployment of the application. Thus, upon the execution or interpretation of the test logic gate by the integration and deployment component 314-4 within a testing workflow, the integration and deployment component 314-4 may be configured to provide a test gate notification to a designated user (e.g., DevOps Engineer, etc.) of an organization associated with the application developer via a development device (e.g., development device 104-2, 104-3, etc.) to elicit approval to proceed beyond the test logic gate. In response to receiving the elicited approval from the development device associated with the designated user, the integration and deployment component 314-4 may execute or interpret additional tasks beyond the test logic gate as defined in the testing workflow such as deployment of the tested application to a cluster in an infrastructure services provider system.

In an embodiment, the application infrastructure component 318 may generally include: an infrastructure management component 318-1, application requirements component 318-2, capacity management component 318-3, and SCM provisioning component 318-4. These components may be operatively and/or communicatively coupled to each other and generally configured to: (1) create an application infrastructure for hosting one or more applications and deploy the one or more applications to the created application infrastructure; (2) estimate infrastructure needs based on created application infrastructure and automatically increase account limits; and (3) determine and provide the number of cluster nodes that will be required and the number of container instances that will be hosted by the cluster nodes for the application.

In an embodiment, the infrastructure management component 318-1 may be generally configured to execute or otherwise interpret infrastructure creation workflow information to create an application infrastructure for an application to be created within a designated infrastructure services provider system. As previously discussed, infrastructure creation information may define an infrastructure creation workflow. The infrastructure creation workflow may be configured to create, without limitation, a cluster that includes at least one slave cluster node and at least one master cluster node to execute the applications. The at least one master cluster node may be configured to execute a cluster management application (e.g., cluster management application 246) to manage at least one slave cluster node up to a maximum number of cluster nodes. Each slave cluster node may be configured to execute a cluster node application (e.g., cluster node application 244) to manage the execution of one or more container applications 136 and/or native applications 138 within their respective slave cluster node. The cluster node application of each slave cluster node may be configured to initiate, monitor, and maintain the execution of one or more applications on the respective slave cluster node. Additionally, the cluster node application of each slave cluster node may be configured to communicate with a master cluster node to provide high availability and scalability of one or more applications hosted on a slave cluster node.

In an embodiment, the infrastructure management component 318-1 may also be generally configured to execute or otherwise interpret deployment configuration information. As previously discussed, deployment configuration information may define a deployment workflow configured to deploy one or more applications to a cluster. Additionally, the deployment workflow may be transmitted to the newly created cluster or an existing cluster and executed or otherwise interpreted by the cluster node application and/or cluster management application including other container applications and/or native applications (e.g., package managers such as DEIS Helm, etc.) to deploy one or more applications to the slave cluster nodes. For example, the deployment workflow may be configured to deploy to one or more slave cluster nodes a telemetry application configured to collect metrics and logs generated by or associated with one or more applications, an overlay network application 242 configured to provide an overlay network to facilitate secure communications between and among one or more applications.

In an embodiment, the infrastructure management component 318-1 may be configured to: (1) receive a deployment ready notification; (2) detect a deployment ready event; or (3) detect changes or updates in the artifact data store 252, all indicating that the application has successfully completed and passed testing workflow and the artifact data store 252 includes the application stored in a container application image. In an embodiment, upon: (1) receiving the deployment ready notification; (2) detecting the deployment ready event; or (3) detecting changes or updates in the artifact data store 252, the infrastructure management component 318-1 may be configured to provide the deployment configuration information to the cluster and communicate with the cluster master node to deploy the container application image or a native application package stored in the artifact data store 252 to one or more slave cluster nodes for execution by their respective container engines or guest OSes in accordance with the deployment workflow defined in the deployment configuration information.

In an embodiment and after the deployment of the container application image or native application package by the infrastructure management component 318-1 has successfully completed, the infrastructure management component 318-1 may also be configured to generate a deployment success event indicating that the application has been successfully deployed to a designed cluster in an infrastructure services provider system. Additionally, the infrastructure management component 318-1 may also be configured to generate a deployment failure event indicating that the application has failed to be deployed to a designed cluster in an infrastructure services provider system.

In an embodiment, the infrastructure management component 318-1 may also configure one or more master cluster nodes with automatic horizontal scaling capable of scaling up the number of slave cluster nodes up to a maximum number and/or scaling down the number of slave cluster nodes to a minimum number. In such embodiments, the master cluster node may be configured to scale up the number of cluster nodes by automatically deploying additional container application images and/or native application packages to additional slave cluster nodes up to a maximum number of slave cluster nodes for the cluster, upon determining that one or more metrics of existing slave cluster nodes have exceeded a specific threshold limit (e.g., CPU utilization of all existing slave cluster nodes have exceed fifty (50) percent, seventy (70) percent, etc.).

Additionally or alternatively, the master cluster node may also be configured to scale down to a minimum number of cluster nodes by, for example, stopping the execution of container instances on slave cluster nodes in the cluster, upon determining that one or more metrics of existing slave cluster nodes have fallen below a specific threshold limit (e.g., CPU utilization of all existing slave cluster nodes have fallen below fifty (50) percent, seventy (70) percent, etc.) for a specific period of time (e.g., one hour, two hours, etc.). In such embodiments, the master cluster node may be further configured to scale down by stopping the execution of container application instances and/or native applications of only slave cluster nodes in the cluster that have been idle (e.g., zero (0) percent CPU utilization and/or no active or pending API requests or responses) for a specific period of time (e.g., one hour, two hours, etc.).

In an embodiment, the application requirements component 318-2 may be generally configured to: (1) receive application requirements information generated and provided by the application orchestration component 312-1; (2) generate application resource information based on the application requirements information; and (3) provide the generated application resource information. As previously discussed, the application resource information may include, without limitation, the number of cluster nodes required for an application, and the number of container instances to be hosted by the cluster nodes for the application.

In an embodiment, the capacity management component 318-3 may be generally configured to predict or estimate the amount of computing resources (e.g., number of server devices and/or guest OSes, etc.) of an infrastructure services provider that are to be purchased and allocated for use for all application developers and organizations. In an embodiment, the capacity management component 318-3 may be configured to predict the amount of computing resources required for a future time period based on the utilization of computing resources by all applications in a past time period. In an embodiment, the capacity management component 318-3 may also be configured to automatically increase the account limits or purchase additional computing resources from an infrastructure services provider based on predicted utilization for a future time period.

In an embodiment, SCM provisioning component 318-4 may be generally configured to host or create a private source code hosting facility (not shown) in the cloud platform system 160 generally configured to manage a private application source code data store (e.g., application source code data store 250). In an embodiment and as previously discussed, the SCM configuration component 314-1 may be configured to request the created private source code hosting facility to provision an application source code data store 250 for storing the application source code information 260 and associated pipeline configuration information 262.

In an embodiment, the application security component 316 may include, without limitation, credential management component 316-1, identity management component 316-2, certificate and access component 316-3, and vulnerability management component 316-4. These components may be generally configured to provide authorization, authentication, access control, and/or accounting. These components may be operatively and/or communicatively coupled to each other and generally configured to: (1) provide management of user credentials; (2) provide authentication, authorization, and access control to one or more APIs; and (3) determine and provide notifications of vulnerabilities and misconfigurations.

In an embodiment, the credential management component 316-1 may be generally configured to store, distribute, and manage credentials (e.g., user name and password, API access keys, etc.) of users of AADDOMA 162 (e.g., application developers of an organization, DevOps engineers of an organization, managers of an organization, executives of an organization, etc.). In an embodiment, the credential management component 316-1 may also be generally configured to enable credential auditing (e.g., remove inactive users, modify users from groups, etc.) on a periodic basis and enforce one or more expiration and rotation policies of credentials.

In an embodiment, identity management component 316-2 may be generally configured to provide authentication, authorization, and access control of users that access the one or more APIs of the AADDOMA 162. To provide authentication, authorization, and access control, the identity management component 316-2 may be configured to issue access tokens that provide access to one or more APIs of the AADDOMA 162 and/or one or more APIs of an application developer's application in accordance with one or more authorization standards (e.g., OAuth, etc.).

In an embodiment, the certificate and access component 316-3 may be generally configured to generate, provide, and/or manage digital certificates distributed to various components of the AADDOMA 162. The distributed digital certificates may be utilized by the various components to secure access between and among one or more components of the AADDOMA 162.

In an embodiment, the vulnerability management component 316-4 may be generally configured to scan for vulnerabilities and misconfigurations (e.g., malware, deprecated applications and components, etc.) in various applications components of the cloud platform system 160 and in one or more applications and associated components deployed in an infrastructure services provider system. Additionally or alternatively, the vulnerability management component 316-4 may be configured to continuously scan for vulnerabilities and misconfigurations in one or more components, in one or more data stores (e.g., application source code data store 250, artifact data store 252, template data store 254, etc.), and one or more applications in the infrastructure services provider systems. In an embodiment, the vulnerability management component 316-4 may also be configured to generate and provide the vulnerabilities assessment information to analysts, administrators, support staff, and developers of the cloud platform system 160.

In an embodiment, the application telemetry component 310 may generally include, without limitation, telemetry collection and storage component 310-1, notification and telemetry processing component 310-2, event stream component 310-3, telemetry visualization component 310-4, and long-term telemetry storage component 310-5. These components may be operatively and/or communicatively coupled to each other and generally configured to: (1) collect and store telemetry information from various components and applications; (2) provide visualization of collected telemetry information (3) analyze collected telemetry information and provide notifications when one or more breaching conditions occurs and the occurrence of one or more breaching conditions requires a notification; (4) and facilitate the communication of events to and from various components of the AADDOMA 162.

In an embodiment, the telemetry collection and storage component 310-1 may be generally configured to monitor health of various components of AADDOMA 162, cluster nodes, and applications. To monitor the health, the telemetry collection and storage component 310-1 may be configured to receive telemetry information from telemetry application 240 one or more cluster nodes and various components of the AADDOMA 162 and store the received telemetry information in a short-term telemetry data store (not shown). In an embodiment, the telemetry information may include one or more metrics (e.g., CPU utilization, disk I/O, network I/O, memory usage) and one or more logs (e.g., API access log, authentication log, etc.). In an embodiment, each metric may be represented a time series of data points for a particular resource (e.g., an application, guest OS, container instance, server device, etc.). In an embodiment, each log may be represented as a time series of occurrences of one or more events (e.g., request, responses, actions, etc.).

In an embodiment, the telemetry collection and storage component 310-1 may be configured to enforce data retention and/or lifecycle policies by removing stored telemetry information after a set time period. Additionally or alternatively, the telemetry collection and storage component 310-1 may also be configured to transfer the stored telemetry information in the short-term telemetry data store to a long-term telemetry data store (not shown) managed by the long-term telemetry storage component 310-5.

In an embodiment, the event stream component 310-3 may be generally configured to facilitate component communications by receive events (e.g., source code update event, deployment ready event, deployment success event, deployment failure event, logging events that include logs and metrics, etc.) published by one or more event publishers indicating the occurrence of one or more changes and/or mutations to one or more components and/or associated data stores of the AADDOMA 162. Additionally, the event stream component 310-3 may also be generally configured to publish the received events to one or more event listeners of the AADDOMA 162. In an embodiment, the one or more event publishers and event listeners may include, without limitation, one or more applications deployed in one or more cluster nodes and various components of the AADDOMA 162. In an embodiment, the event stream component 310-3 may also be configured to store the received events as event stream information in an event stream data store (not shown). In an embodiment, the stored event stream information may be organized as a time series of occurrences of the one or more events so that it may be correlated with the stored telemetry information.

In an embodiment, the notification and telemetry processing component 310-2 may be generally configured to process the telemetry information and event stream information and determine the occurrence of one or more breach conditions whether one or more metrics, logs, and/or events includes data points or entries that meets and/or exceeds a threshold value defined for a particular metric, log, and/or event within a particular time frame. Additionally or alternatively, the notification and telemetry processing component 310-2 may also be configured to perform predictive and trend based analytics by utilizing one or more machine learning algorithms (e.g., regression algorithms, decision tree algorithms, Bayesian algorithms, etc.). The telemetry information and/or event stream information may be utilized by the notification and telemetry processing component 310-2 to train the one or more machine learning algorithms in order to predict an occurrence of one or more breach conditions before they occur. Based on the occurrence and/or predicted occurrence of one or more breaching conditions, the notification and telemetry processing component 310-2 may be further configured to provide an alarm notification to various users of the AADDOMA 162 as well as analysts, administrators, support staff, and developers of the AADDOMA 162.

In an embodiment, the telemetry visualization component 310-4 may be generally configured to provide, in one or more GUIs, visualizations of collected telemetry information for debugging, performance monitoring, and performance optimizations. Additionally or alternatively, the telemetry visualization component 310-4 may be configured to correlate collected telemetry information with stored event stream information and visually present the combination in one or more GUIs. In an embodiment, the telemetry visualization component 310-4 may provide the collected telemetry information in one or more GUIs to various users of the AADDOMA 162 as well as analysts, administrators, support staff, and developers of the AADDOMA 162.

In an embodiment, the long-term telemetry storage component 310-5 may be generally configured to provide a cost effective long-term telemetry data store to store telemetry information. In an embodiment, the long-term telemetry storage component 310-5 may be configured to store the telemetry information in compliance with standards and policies set forth by the application developer's organization, and the application developer's clients, customers, or consumers, and/or industry.

Example Method

Figure 4:
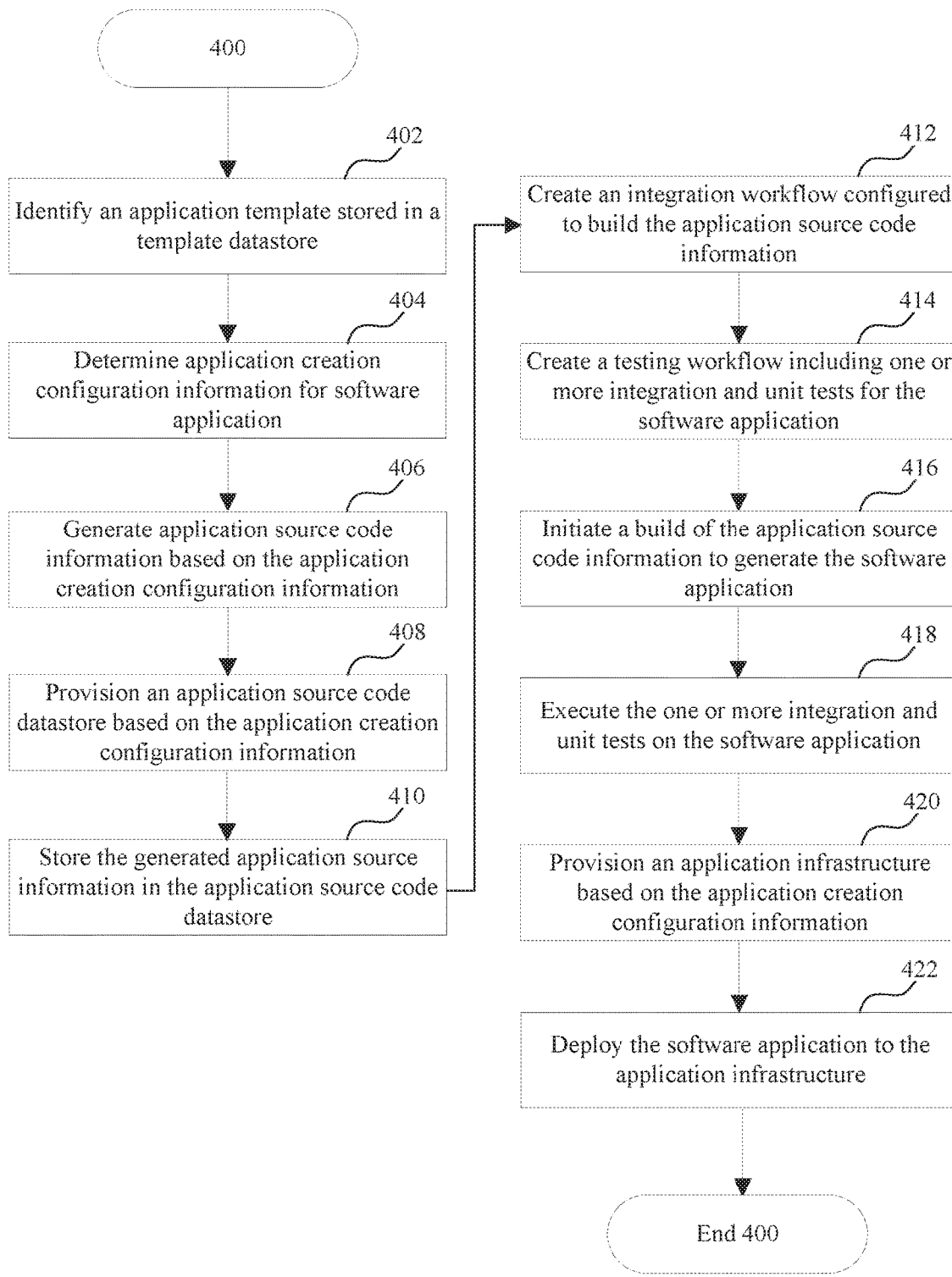
FIG. 4 illustrates an example method for creating and deploying a software application according to an embodiment.

FIG. 4 illustrates an example method 400 for creating and deploying a software application, according to an embodiment. The software application may be a container application or native application, as discussed with respect to FIGS. 1 and 2. It is to be appreciated that not all steps may be needed to perform the disclosure provided herein. Further, some of the steps may be performed simultaneously, or in a different order than shown in FIG. 4, as will be understood by a person of ordinary skill in the art. In some embodiments, method 400 may be performed by AADDOMA 162 of FIG. 1.

Method 400 begins at stage 402 by identifying an application template. In various embodiments, the application template may be stored in a template data store residing within cloud platform system 160 of FIG. 1 (e.g., template data store 254 of FIG. 2), application development system 102, or an external device accessible via network 150. The application template may define one or more code styles and application dependencies for the software application, which may be used to automatically generate application source code. In an embodiment, the application template may be identified for an application developer through a CLI or GUI. For example, the application developer may operate a development device, such as development device 104 of FIG. 1, that includes a CLI and/or GUI based application that communicates with the application orchestration component 312-1 of AADDOMA 162. In an embodiment, more than one application template may be identified, and overlapping settings or requirements may be selected in an ordered or hierarchical fashion. Method 400 is further discussed below with reference to elements of FIGS. 1-3.

At stage 404, application creation configuration information for a new software application may be determined based on the identified application template. In an embodiment, stage 404 may be performed by the application orchestration component 312-1 of AADDOMA 162. As will be discussed in further detail with respect to method 500 of FIG. 5, the application creation configuration information may include, without limitation, the location of an application source code data store configured to store application source code information, application source code access information for accessing private or secured application source code data stores, a deployment location of the application, a name of the application, a brief description of the application, the application creator, the creator's email address for the application, version information for the application, an organization associated with application, development stack information associated with the application, the identified application template, or any combination of thereof. The application creation configuration information may be determined, at least in part, through interaction with the application developer via a CLI or GUI application on the development device.

At stage 406, application source code information (e.g., source code of the software application to be created) may be generated based on the application creation configuration information. In an embodiment, stage 406 may be performed by the application orchestration component 312-1 of AADDOMA 162. In an embodiment, the application source code information may include application build configuration information. The application build configuration information may include, without limitation, a makefile or other build configuration file including build directives, an application build script, additional build tools required to build the application source code information, or any combination thereof. In an embodiment, the application source code information may further include a series of server-side and/or client-side code files arranged to provide an application shell. The files may be defined in languages identified by the application developer or determined from the identified application template.

At stage 408, an application source code data store may be provisioned based on the application creation configuration information. In an embodiment, stage 408 may be performed by application orchestration component 312-1, the SCM configuration component 314-1, and/or the SCM provisioning component 318-4 of AADDOMA 162. In an embodiment, the application creation configuration information may include a location of an application source code data store. This data store may be a public or private repository offered by a source code hosting facility, for example GitHub or GitLab. Alternatively, the application source code data store may be hosted in a private location associated with the application developer, or in a private data store such as application source code data store 250 residing on cloud platform system 160 of FIG. 1. If the application code data store is private, the application creation configuration information may also include access information (e.g., an API access token, login name and password, etc.).

At stage 410, the generated application source code information may be stored in the application code data store. In an embodiment, stage 410 may be performed by the application orchestration component 312-1 and/or the SCM configuration component 314-1 of AADDOMA 162. For example, once the application source code information is generated, the application code files and application build configuration may be transmitted (e.g., via network 150) to the application source code data store and committed to a master or mainline branch for the application.

At stage 412, an integration workflow configured to build the application source code information may be created. In an embodiment, stage 412 may be performed by the application orchestration component 312-1, and/or integration and deployment component 314-4 of AADDOMA 162. In an embodiment, the integration workflow may be configured to build the application source code information by executing a build process, which may build the application according to the application build configuration information. In an embodiment, the integration workflow may be stored in the application source code data store as one or more configuration and/or executable files. These files may then be edited by an application developer to further customize the integration workflow. In an embodiment, an ephemeral build of the software application may be performed following configuration of the integration workflow to ensure that the workflow has been properly configured. This ephemeral build may be performed, in various embodiments, on cloud platform 160 or application development system 102 of FIG. 1.

At stage 414, a testing workflow configured to test the software application may be created. In an embodiment, stage 414 may be performed by the application orchestration component 312-1, code analysis component 314-2, integration and deployment component 314-4, performance and testing component 314-6, and/or vulnerability management component 316-4 of AADDOMA 162. In an embodiment, the testing workflow may include one or more integration tests, one or more unit tests, or any combination thereof. Initial tests included in the testing workflow may be determined and defined based on the application creation configuration information. For example, the application creation configuration information may include initial tests specified by the application developer and/or default tests. The testing workflow may also be configured to test dependent components of the software application, such as one or more components of AADDOMA 162, to ensure proper integration with the software application. In an embodiment, the testing workflow may be stored in the application source code data store as one or more configuration and/or executable files. These files may then be edited by an application developer to further customize or create new integration and unit tests.

In an embodiment, the testing workflow may be configurable to include one or more test logic gates to control the progression through the testing workflow. For example, a test logic gate may be inserted at the end of completion of one or more tests. The inserted test logic gate may be configured to notify a designated user (e.g., DevOps Engineer, etc.) to provide manual approval at the end of the testing workflow before completion of the testing workflow. Thus, upon the execution or interpretation of the test logic gate within the testing workflow, a test gate notification may be provided to a designated user of an organization to elicit approval to proceed beyond the test logic gate. In response to receiving the elicited approval from the development device associated with the designated user, execution of the testing workflow may proceed. In an embodiment, the results of each test may also direct the testing workflow to execute various branches within the workflow. For example, a failed test may prompt additional tests to be executed that would not otherwise be executed as part of the core testing workflow.

At stage 416, a build of the application source code information may be initiated to generate the software application. In an embodiment, stage 416 may be performed by the application orchestration component 312-1, SCM configuration component 314-1, and/or integration and deployment component 314-4 of AADDOMA 162. In an embodiment, the generated application source code information may first be retrieved from the application source code data store, for example by pulling the current version of the application source code information from the master or mainline branch. The build process of the integration workflow may then build or compile the retrieved application source code information according to the build configuration information to generate the software application. In an embodiment, the built application may include binary artifact information, for example binary artifact information 264 of FIG. 2. In an embodiment, the binary artifact information may include, without limitation, one or more binary files representing the built application and/or a container application image of the built application, as well as other artifacts resulting from the build process.

In an embodiment, a location of an artifact data store configured to store the built application, such as artifact data store 252 of FIG. 2, may be determined based on the application creation configuration information. This location may be supplied by the application developer or determined automatically based on presets or defaults. The location may be validated to ensure existence and access to the artifact data store, and the built application may be transmitted and stored in the artifact data store. In an embodiment, the artifact data store may be dynamically provisioned and validated prior to building the application source code information to prevent execution of the application build process in the event of an error. One of skill in the art will appreciate that the built application may include artifacts other than binary files, and the artifact data store may store all data resulting from building the application source code information as discussed above.

At stage 418, the one or more integration and unit tests of the testing workflow may be executed to test the built application. In an embodiment, stage 418 may be performed by the performance and testing component 314-6 of AADDOMA 162. In an embodiment, failure of certain tests, a combination of tests, or a specified number of tests may terminate method 400.

At stage 420, an application infrastructure configured to host the software application may be provisioned in an infrastructure services provider system, such as infrastructure services provider systems 116-1 and 116-2 of FIG. 1, based on the application creation configuration information. The provisioned application infrastructure may also host other container applications and/or native applications. In an embodiment, stage 420 may be performed by the infrastructure management component 318-1 of AADDOMA 162, as discussed above with respect to FIG. 3. In an embodiment, execution of stage 420 may be part of an infrastructure creation workflow, as discussed with respect to FIGS. 2 and 3. The infrastructure creation workflow may be created based on the determined application creation configuration information for the application.

Finally, at stage 422, the software application may be deployed to the provisioned application infrastructure. Alternatively, the software application may be deployed to an existing application infrastructure at stage 422, in which case stage 420 may be bypassed. In an embodiment, stage 422 may be performed by the integration and deployment component 314-4 in conjunction with the artifact repository component 314-5 of AADDOMA 162, as discussed above with respect to FIG. 3. In some embodiments, this deployment may occur automatically upon generation of the software application at stage 416 or upon successful completion of the one or more integration and unit tests at stage 418. Deployment of the software application may also be triggered by detecting a change in the artifact data store, detecting a deployment ready event, or receiving a deployment ready notification. In an embodiment, execution of stage 422 may be part of a deployment workflow, as discussed with respect to FIGS. 2 and 3. The deployment workflow may be created and configured based on the determined application creation configuration information for the application.

In an embodiment, the build of the application source code information and execution of the testing workflow may be initiated by AADDOMA 162 and executed within cloud platform system 160. Alternatively, AADDOMA 162 may trigger an application infrastructure separate from cloud platform system 160 to perform the build of the application source code information and execute the testing workflow. In this case, stages 416 and 418 may be performed following provisioning of an application infrastructure at stage 420. This may effectively reduce the overall load on AADDOMA 162 by distributing the application build and testing execution to the infrastructure provisioned to host the software application.

In an embodiment, the integration workflow and testing workflow created at stages 412 and 414 may subsequently facilitate automatic building and testing of the software application in response to updates to application source code information, as discussed with respect to FIG. 3. For example, a developer may make changes to the application source code information and commit the changes to the provisioned application source code data store. The integration workflow may detect the changes in the application source code data store, for example via an event triggered by the application source code data store, which may then initiate a new build of the updated application source code information and execution of the testing workflow. After the updated software application has been built and stored in the artifact data store, the deployment workflow may deploy the built updated application to the provisioned application infrastructure in accordance with the configured process.

Figure 5:
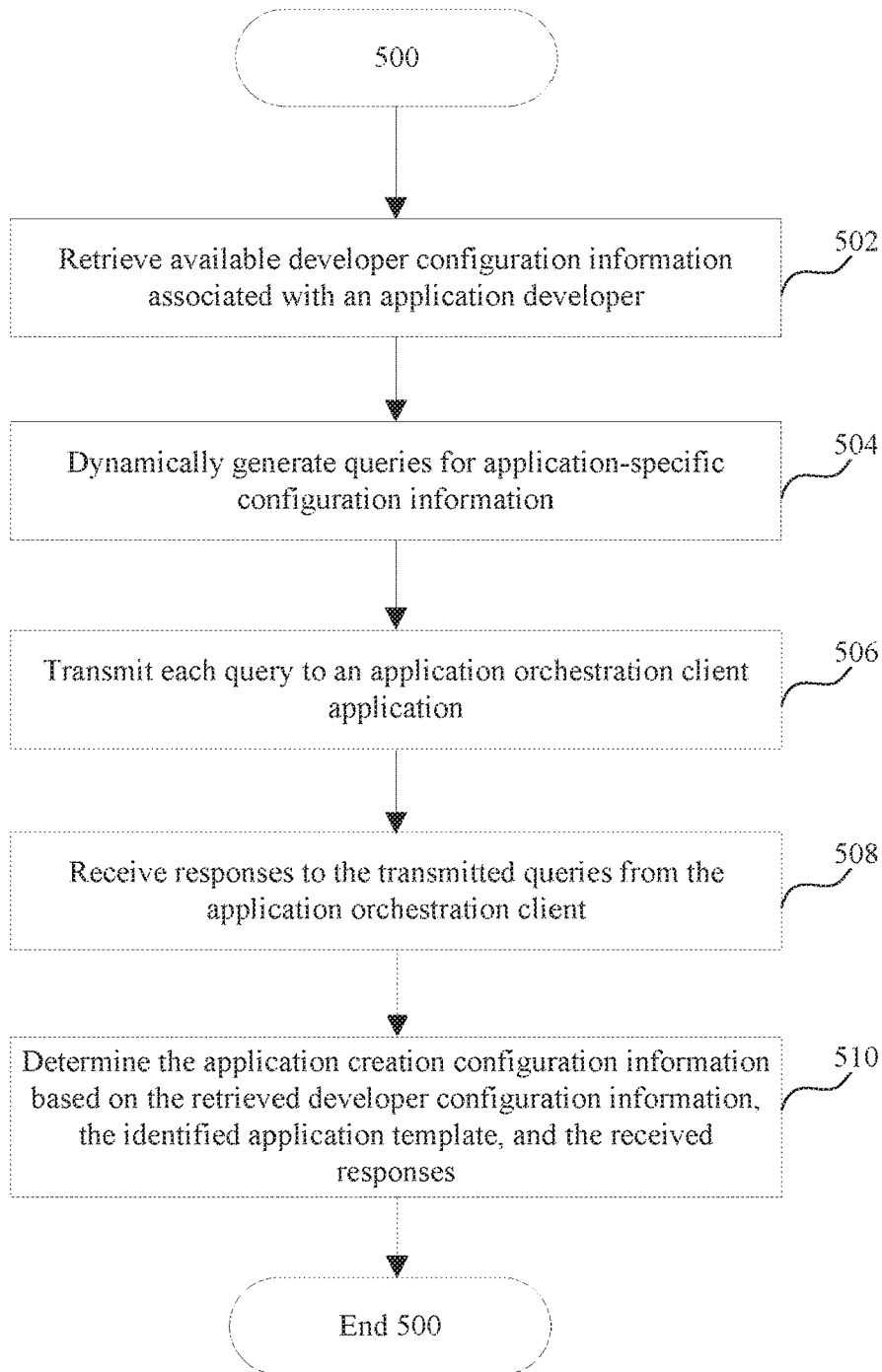
FIG. 5 illustrates an example method for determining application creation configuration information for a software application according to an embodiment.

FIG. 5 illustrates an example method 500 for determining application creation configuration information for a software application, according to an embodiment. It is to be appreciated that not all steps may be needed to perform the disclosure provided herein. Further, some of the steps may be performed simultaneously, or in a different order than shown in FIG. 5, as will be understood by a person of ordinary skill in the art. In some embodiments, method 500 may be performed by one or more components of AADDOMA 162 (e.g., application orchestration component 312-1, etc.).

Method 500 begins at stage 502 by retrieving available developer configuration information associated with an application developer. In an embodiment, the developer configuration information may include default application creation configuration information for the application developer and/or an organization associated with the application developer.

In an embodiment, the application developer may first be authenticated based on user authentication information before proceeding to create a new application. The application developer may be an individual, or may be part of a larger organization. In the latter case, the organization may be associated with common configuration preferences and defaults to be included in the application creation configuration information. For example, the organization may designate a particular source code management system and/or source code data repository location for new software applications. Rather than query the application developer for this information, these default preferences may be retrieved automatically.

Further, an organization may be partitioned into departments or groups including group preferences. For example, different customer-facing applications may be managed by different groups within the organization, such as an application targeting home buyers and another application targeting real estate professionals. Alternatively, different groups may create and manage internal tools within the organization, such as an accounting group and a marketing group. One group within the organization may specify certain application configuration preferences and defaults, while another group may specify different preferences and defaults. The application developer may be associated with an organizational role indicating an associated group, which may be determined as part of the authentication process. In an embodiment, organizational configuration preferences and defaults may be applied hierarchically. For example, configuration defaults of an organization may be overridden by defaults of a particular group. Additionally or alternatively, configuration defaults may be combined. For example, an organization may be associated with the location of a source code management system, while a group may be associated with the location of a particular source code data store within the source code management system.

Similarly, an application developer may be associated with personal configuration preferences and defaults. This information may also be applied hierarchically to organization and group configuration defaults/preferences when determining application creation configuration information for a new software application. In an embodiment, application creation configuration information for previous applications created by the application developer may also be retrieved at stage 502. This historical usage data may be used at stages 504-508 to suggest settings to the application developer for the new software application. Thus, the retrieval of available developer configuration information associated with an application developer minimizes required time of the application developer to design and deploy new applications.

At stage 504, queries for application-specific configuration information may be dynamically generated based on the retrieved developer configuration information and an identified application template, for example the application template identified at stage 402 of method 400. Example queries may include, without limitation, a programming language for the software application, a database management system for use with the application, a list of contributors to the application, and stylistic code generation preferences for the application in relation to the identified application template. In an embodiment, the application template identified at stage 402 of method 400 may also be identified by the application developer in response to a query. In an embodiment, the retrieved developer configuration information and the identified application template may be analyzed to determine missing application creation configuration information needed to create the software application. The initial generated queries may then request this information.

At stage 506, each query may be transmitted to an application orchestration client application, such as application orchestration client application 214 of FIG. 2. These queries may be presented to an application developer by the application orchestration client application in the form of questions within a CLI or GUI. Queries may allow freeform responses or may present a list of options for the application developer to choose from. In an embodiment, the list of options may include historical usage data associated with the application developer, as discussed with respect to stage 502.

At stage 508, responses to the transmitted queries may be received from the application orchestration client application. In an embodiment, stages 504, 506, and 508 may be performed iteratively to allow for dynamic generation of queries at stage 504 in response to the responses received from the application orchestration client application at stage 508. This dialog enables the generated queries to adapt to the requirements of the application being created, for example based on an identified application template and development stack preferences for the application.

At stage 510, application creation information may be determined based on the retrieved developer configuration information, the identified application template, and the received responses from the application orchestration client application. In an embodiment, the CLI or GUI may further allow an application developer to override preferences and defaults of the retrieved developer configuration information. Thus, by dynamically generating queries for application-specific creation information and allowing the application developer to override retrieved developer configuration information, method 500 minimizes the burden on the application developer to create a new software application while maintaining flexibility needed for advanced developers.

Figure 6:
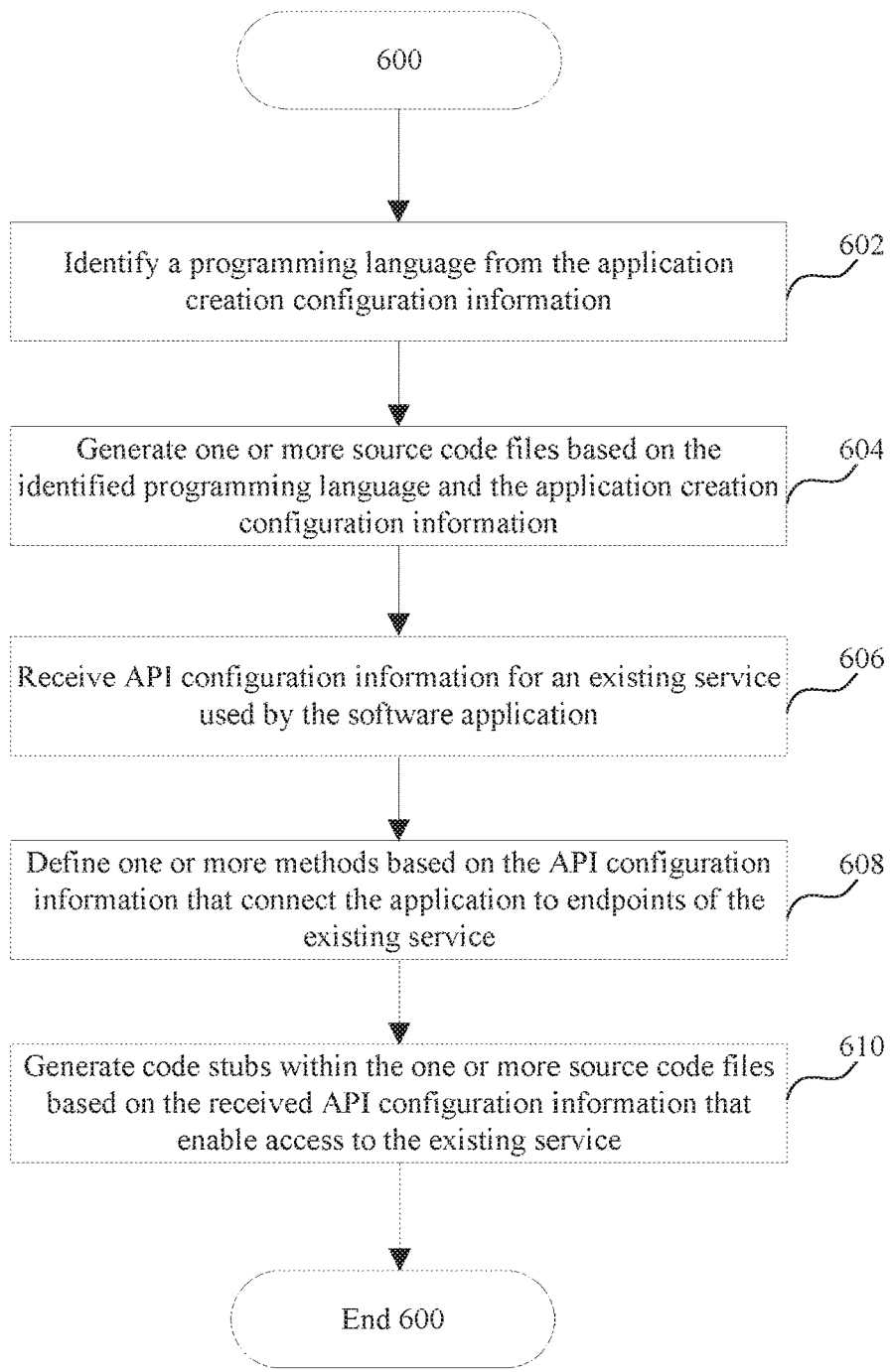
FIG. 6 illustrates an example method for generating application source code information for a software application according to an embodiment.

FIG. 6 illustrates an example method 600 for generating application source code information for a software application, according to an embodiment. It is to be appreciated that not all steps may be needed to perform the disclosure provided herein. Further, some of the steps may be performed simultaneously, or in a different order than shown in FIG. 6, as will be understood by a person of ordinary skill in the art. In some embodiments, method 600 may be performed by one or more components of AADDOMA 162 (e.g., application orchestration component 312-1, etc.).

Method 600 begins at stage 602 by identifying a programming language from determined application creation configuration information, for example the determined application creation configuration information of method 500. As discussed with respect to method 500, the programming language may be retrieved as part of available developer configuration information, specified in the identified application template, or specified by the application developer in response to a query. Examples of programming languages may include, without limitation, Java, JavaScript, C #, C++, Python, PHP, Ruby, Go, Perl, Erlang, Node.js, Elixir, etc.

At stage 604, one or more source code files may be generated based on the identified programming language and the determined application creation configuration information. In an embodiment, the determined application creation information may be provided to a code generator to scaffold a software application shell including the one or more source code files. The code generator may be part of, for example, application orchestration component 312-1 of AADDOMA 162. In an embodiment, the application shell may define basic dependencies, connections, and initial tests needed to build and run the software application.

At stage 606, API configuration information for an existing service used by the software application may be received, as discussed with respect to FIG. 1. For example, an application developer may desire to connect the new software application to existing services of an organization of which the developer is a part of. The API configuration information for the service may include, without limitation, authentication information (e.g., an API key) to access the service and available methods for invoking the service.

At stage 608, one or more methods may be defined based on the API configuration information and in the identified programming language that connect the application to endpoints of the existing service. These methods may include logic to make calls to the existing service as permitted by the service's API.

At stage 610, code stubs may be generated within the generated source code files based on the received API configuration information. In an embodiment, each code stub enables access to the existing service by incorporating the methods defined at stage 608. For example, an application developer may place business logic of the application requiring use of the existing service within the generated code stubs, and each generated code stub may already include the necessary logic to call the existing service.

Example Computer System

Various embodiments and components therein can be implemented, for example, using one or more well-known computer systems, such as, for example, platform server devices 164, development devices 104, consumer devices 108, server devices 122, and server devices 124 of FIG. 1. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communications path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Figure 7:
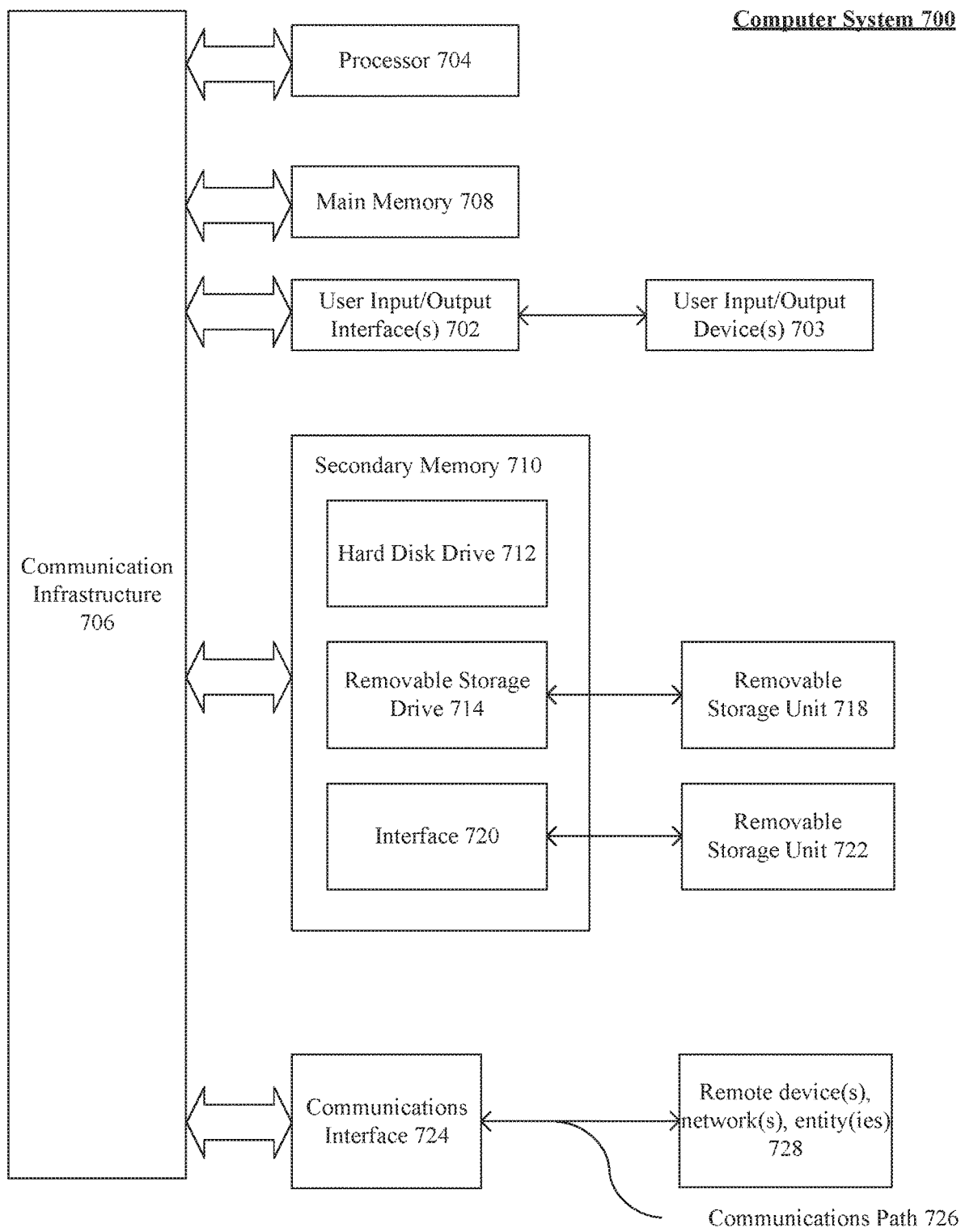
FIG. 7 illustrates an example computer system useful for implementing various embodiments.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventors, and thus, are not intended to limit the disclosure or the appended claims in any way.

While the invention has been described herein with reference to exemplary embodiments for exemplary fields and applications, it should be understood that the invention is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the disclosure should not be limited by any of the above-described exemplary embodiments, but should be defined only in accordance with the following claims and their equivalents.

What is claimed is:
1. A system, comprising:
at least one processor; and
a memory operatively coupled to the at least one processor, the at least one processor configured to perform operations comprising:
identifying an application template stored in a template data store;
determining application creation configuration information, for a software application, based on the identified application template;
generating application source code information based on the application creation configuration information, the application source code information including application build configuration information;
provisioning an application source code data store based on the application creation configuration information;
storing the application source code information in the application source code data store;
creating an integration workflow including an application build process configured to build the application source code information based on the application build configuration information;
predicting an infrastructure need, based at least in part on the integration workflow including the application build process;
scaling an infrastructure limit, based at least in part on the integration workflow including the application build process;
initiating a build of the application source code information, based on the application build configuration information, to generate the software application;

provisioning an application infrastructure configured to host the software application in an infrastructure services provider system based at least in part on the infrastructure need as predicted, the infrastructure limit as scaled, and the application creation configuration information;

initiating a rebuild of the application source code information, in response to a change in the application source code information detected via the integration workflow;

testing the software application according to a testing workflow comprising a logic gate; and deploying the software application to the application infrastructure upon generation of the software application, in response to a notification corresponding to the logic gate.

2. The system of claim 1, wherein the at least one processor is further configured to:

retrieve available developer configuration information associated with an application developer, wherein the developer configuration information includes default application creation configuration information for the application developer or an organization associated with the application developer;

dynamically generate queries for application-specific configuration information based on the developer configuration information and the identified application template;

transmit each query to an application orchestration client application;

receive one or more responses to the transmitted queries from the application orchestration client application; and determine the application creation configuration information based on the developer configuration information, the identified application template, and the received one or more responses.

3. The system of claim 1, wherein the at least one processor is further configured to:

identify a programming language from the application creation configuration information;

generate one or more source code files based on the identified programming language and the application creation configuration information;

receive application programming interface (API) configuration information for an existing service used by the software application;

define one or more service methods based on the received API configuration information, wherein each service method is defined in the identified programming language and connects to an endpoint of the existing service; and generate code stubs within the one or more source code files based on the received API configuration information, wherein each code stub is defined in the identified programming language and incorporates one of the one or more service methods to enable access to the existing service.

4. The system of claim 1, wherein the at least one processor is further configured to:

determine a location of an artifact data store based on the application creation configuration information;

validate the location of the artifact data store;

connect the integration workflow to the application source code data store and the artifact data store;

retrieve the application source code information from the application source code data store;

reinitiate the application build process to generate the software application; and store the software application in the artifact data store.

5. The system of claim 4, wherein the at least one processor is further configured to:

identify one or more errors in the application source code information via the testing workflow, wherein the testing workflow comprises at least one of a unit test, integration test, or code analysis.

6. The system of claim 4, wherein the reinitiating the application build process is triggered by an accelerated application development, deployment, orchestration, and management application (AADDOMA) separate from the provisioned application infrastructure, and wherein the application build process is executed within the provisioned application infrastructure.

7. The system of claim 1, wherein the at least one processor is further configured to:

periodically provide application creation status information to an application orchestration client application.

8. A computer-implemented method, comprising:

identifying an application template stored in a template data store;

determining application creation configuration information for a software application, based on the identified application template;

generating application source code information based on the application creation configuration information, the application source code information including application build configuration information;

provisioning an application source code data store based on the application creation configuration information;

storing the application source code information in the application source code data store;

creating an integration workflow including an application build process configured to build the application source code information based on the application build configuration information;

predicting an infrastructure need, based at least in part on the integration workflow including the application build process;

scaling an infrastructure limit, based at least in part on the integration workflow including the application build process;

initiating a build of the application source code information, based on the application build configuration information, to generate the software application;

provisioning an application infrastructure configured to host the software application in an infrastructure services provider system based at least in part on the infrastructure need as predicted, the infrastructure limit as scaled, and the application creation configuration information;

initiating a rebuild of the application source code information, in response to a change in the application source code information detected via the integration workflow;

testing the software application according to a testing workflow comprising a logic gate; and deploying the software application to the application infrastructure upon generation of the software application.

9. The method of claim 8, wherein determining the application creation configuration information further comprises:

retrieving available developer configuration information associated with an application developer, wherein the developer configuration information includes default application creation configuration information for the application developer or an organization associated with the application developer;

dynamically generating queries for application-specific configuration information based on the developer configuration information and the identified application template;

transmitting each query to an application orchestration client application;

receiving one or more responses to the transmitted queries from the application orchestration client application; and determining the application creation configuration information based on the developer configuration information, the identified application template, and the received one or more responses.

10. The method of claim 8, wherein generating the application source code information further comprises:

identifying a programming language from the application creation configuration information;

generating one or more source code files based on the identified programming language and the application creation configuration information;

receiving application programming interface (API) configuration information for an existing service used by the software application;

defining one or more service methods based on the received API configuration information, wherein each service method is defined in the identified programming language and connects to an endpoint of the existing service; and generating code stubs within the one or more source code files based on the received API configuration information, wherein each code stub is defined in the identified programming language and incorporates one of the one or more service methods to enable access to the existing service.

11. The method of claim 8, wherein initiating the build of the application source code information further comprises:

determining a location of an artifact data store based on the application creation configuration information;

validating the location of the artifact data store;

connecting the integration workflow to the application source code data store and the artifact data store;

retrieving the application source code information from the application source code data store;

initiating the application build process to generate the software application; and storing the software application in the artifact data store.

12. The method of claim 11, wherein creating the integration workflow further comprises:

identifying one or more errors in the application source code information via the testing workflow, wherein the testing workflow comprises at least one of a unit test, integration test, or code analysis.

13. The method of claim 11, wherein the initiating the application build process is triggered by an accelerated application development, deployment, orchestration, and management application (AADDOMA) separate from the provisioned application infrastructure, and wherein the application build process is executed within the provisioned application infrastructure.

14. The method of claim 8, further comprising:

periodically providing application creation status information to an application orchestration client application.

15. A non-transitory computer-readable storage device having instructions stored thereon that, when executed by at least one processor, causes the at least one processor to perform operations comprising:

identifying an application template stored in a template data store;

determining application creation configuration information for a software application, based on the identified application template;

generating application source code information based on the application creation configuration information, the application source code information including application build configuration information;

provisioning an application source code data store based on the application creation configuration information;

storing the application source code information in the application source code data store;

creating an integration workflow including an application build process configured to build the application source code information based on the application build configuration information;

predicting an infrastructure need, based at least in part on the integration workflow including the application build process;

scaling an infrastructure limit, based at least in part on the integration workflow including the application build process;

initiating a build of the application source code information, based on the application build configuration information, to generate the software application;

provisioning an application infrastructure configured to host the software application in an infrastructure services provider system based at least in part on the infrastructure need as predicted, the infrastructure limit as scaled, and the application creation configuration information;

initiating a rebuild of the application source code information, in response to a change in the application source code information detected via the integration workflow;

testing the software application according to a testing workflow comprising a logic gate; and deploying the software application to the application infrastructure upon generation of the software application, in response to a notification corresponding to the logic gate.

16. The non-transitory computer-readable storage device of claim 15, wherein to determine the application creation configuration information, the operations further comprise:

retrieving available developer configuration information associated with an application developer, wherein the developer configuration information includes default application creation configuration information for the application developer or an organization associated with the application developer;

dynamically generating queries for application-specific configuration information based on the developer configuration information and the identified application template;

transmitting each query to an application orchestration client application;

receiving one or more responses to the transmitted queries from the application orchestration client application; and determining the application creation configuration information based on the developer configuration information, the identified application template, and the received one or more responses.

17. The non-transitory computer-readable storage device of claim 15, wherein to generate the application source code information, the operations further comprise:
   identifying a programming language from the application creation configuration information;
   generating one or more application code files based on the identified programming language and the application creation configuration information;
   receiving application programming interface (API) configuration information for an existing service used by the software application;
   defining one or more service methods based on the received API configuration information, wherein each service method is defined in the identified programming language and connects to an endpoint of the existing service; and
   generating code stubs within the one or more application code files based on the received API configuration information, wherein each code stub is defined in the identified programming language and incorporates one of the one or more service methods to enable access to the existing service.

18. The non-transitory computer-readable storage device of claim 15, wherein to initiate the build of the application source code information, the operations further comprise:
   determining a location of an artifact data store based on the application creation configuration information;
   validating the location of the artifact data store;
   connecting the integration workflow to the application source code data store and the artifact data store;
   retrieving the application source code information from the application source code data store;
   initiating the application build process to generate the software application; and
   storing the software application in the artifact data store.

19. The non-transitory computer-readable storage device of claim 18, wherein to create the integration workflow, the operations further comprise:
   identifying one or more errors in the application source code information via the testing workflow, wherein the testing workflow comprises at least one of a unit test, integration test, or code analysis.

20. The non-transitory computer-readable storage device of claim 18, wherein the initiating the application build process is triggered by an accelerated application development, deployment, orchestration, and management application (AADDOMA) separate from the provisioned application infrastructure, and wherein the application build process is executed within the provisioned application infrastructure.

* * * * *